(12) United States Patent
Chen et al.

(10) Patent No.: US 9,838,261 B2
(45) Date of Patent: Dec. 5, 2017

(54) METHOD, APPARATUS, AND SYSTEM FOR PROVIDING NETWORK TRAVERSING SERVICE

(71) Applicant: Huawei Technologies Co., Ltd., Shenzhen, Guangdong (CN)

(72) Inventors: Aiping Chen, Hangzhou (CN); Zhanbing Zhang, Moscow (RU)

(73) Assignee: Huawei Technologies Co., Ltd., Shenzhen (CN)

( * ) Notice: Subject to any disclaimer, the term of this patent is extended or adjusted under 35 U.S.C. 154(b) by 451 days.

(21) Appl. No.: 14/488,663

(22) Filed: Sep. 17, 2014

(65) Prior Publication Data

US 2015/0006737 A1 Jan. 1, 2015

Related U.S. Application Data

(63) Continuation of application No. PCT/CN2012/084827, filed on Nov. 19, 2012.

(51) Int. Cl.
*G06F 15/173* (2006.01)
*H04L 12/24* (2006.01)
(Continued)

(52) U.S. Cl.
CPC ............ *H04L 41/12* (2013.01); *H04L 5/0044* (2013.01); *H04L 12/4633* (2013.01);
(Continued)

(58) Field of Classification Search
None
See application file for complete search history.

(56) References Cited

U.S. PATENT DOCUMENTS 7,415,512 B1 * 8/2008 Moon ....................... G06F 8/60
370/401
7,496,651 B1 * 2/2009 Joshi ................ H04L 29/12792
709/217

(Continued)

FOREIGN PATENT DOCUMENTS

| CN | 101599979 A | 12/2009 |
| CN | 101843131 A | 9/2010 |
| WO | WO 2010045264 A1 | 4/2010 |

OTHER PUBLICATIONS

Schaffrath et al., "Network Virtualization Architecture: Proposal and Initial Prototype," Proceedings of ACM SIGCOMM VISA (2009).

(Continued)

*Primary Examiner* — Viet Vu
*Assistant Examiner* — James Edwards
(74) *Attorney, Agent, or Firm* — Leydig, Voit & Mayer, Ltd.

(57) ABSTRACT

Embodiments of the present invention provide a method, an apparatus, and a system for providing a network traversing service. A resource management center sends a network traversing tunnel resource creating instruction to a secure traversing server according to a received network traversing tunnel resource leasing request sent by a management server of a carrier. After the secure traversing server creates a network traversing tunnel resource, the information of the network traversing tunnel resource is sent to the management server of the carrier through the resource management center. The information of the network traversing tunnel resource includes virtual access point information and service channel information. Thus, the management server of the carrier can provide a network traversing service for a terminal according to the virtual access point information and the service channel information. Network expandability (Continued)

of the carrier and reliability of network traversing can be improved by using the method.

15 Claims, 11 Drawing Sheets

(51) Int. Cl.
   *H04L 29/06* (2006.01)
   *H04L 5/00* (2006.01)
   *H04L 12/947* (2013.01)
   *G06F 15/177* (2006.01)
   *H04L 12/46* (2006.01)

(52) U.S. Cl.
   CPC .......... *H04L 49/251* (2013.01); *H04L 63/029* (2013.01); *H04L 63/0272* (2013.01); *G06F 15/177* (2013.01); *H04L 12/4641* (2013.01)

(56) References Cited

U.S. PATENT DOCUMENTS

| | | | | |
|---|---|---|---|---|
| 8,543,673 | B2* | 9/2013 | Calippe | H04L 41/0843 709/221 |
| 9,258,743 | B2* | 2/2016 | Ji | H04W 28/16 |
| 2003/0033401 | A1* | 2/2003 | Poisson | H04L 12/4675 709/224 |
| 2003/0108041 | A1* | 6/2003 | Aysan | H04L 12/4633 370/389 |
| 2005/0026596 | A1* | 2/2005 | Markovitz | G06Q 20/00 455/411 |
| 2006/0187942 | A1* | 8/2006 | Mizutani | H04L 47/2408 370/401 |
| 2006/0191005 | A1 | 8/2006 | Muhamed et al. | |
| 2006/0223527 | A1* | 10/2006 | Lee | H04W 48/08 455/432.2 |
| 2008/0162637 | A1* | 7/2008 | Adamczyk | H04L 12/5815 709/204 |
| 2009/0116389 | A1 | 5/2009 | Ji et al. | |
| 2010/0278141 | A1* | 11/2010 | Choi-Grogan | H04W 36/0083 370/331 |
| 2010/0317286 | A1* | 12/2010 | Jung | H04B 7/2606 455/9 |
| 2012/0265882 | A1* | 10/2012 | Hatasaki | G06F 9/5083 709/226 |
| 2013/0007233 | A1* | 1/2013 | Lv | H04L 61/2038 709/222 |
| 2014/0098673 | A1* | 4/2014 | Lee | H04L 45/64 370/238 |

OTHER PUBLICATIONS

Papadimitriou et al., "Implementing Network Virtualization for a Future Internet," 20th ITC Specialist Seminar on Network Virtualization-Concept and Performance Aspects (May 2009).

* cited by examiner

METHOD, APPARATUS, AND SYSTEM FOR PROVIDING NETWORK TRAVERSING SERVICE

CROSS-REFERENCE TO RELATED APPLICATIONS

This application is a continuation of International Application No. PCT/CN2012/084827, filed on Nov. 19, 2012, which is hereby incorporated by reference in its entirety.

TECHNICAL FIELD

The present invention relates to the field of communications technologies, and in particular, to a method, apparatus, and a system for providing a network traversing service.

BACKGROUND

As convergence of information technologies and communications technologies is continuously accelerated in recent years, a boundary between Internet communications and conventional wireless/fixed network communications has quickly faded away. To deal with challenges from Internet service carriers, global communications carriers accelerate deployment of converged communications services based on the Internet protocol (IP).

The Internet is open and access environments such as enterprises, individuals, families, and public places are complicated and diversified, so for converged communications carriers, many security and access challenges exist. In a process of promoting the converged communications services on the Internet, both protection of personal privacy or corporate secrets and how to ensure that a service smoothly reaches a core network of a converged communications carrier in various complicated network accessing environments are involved. When a converged communications service is used in an open Internet environment, a problem that some service traffic cannot reach a core network of a converged communications carrier exists, where the problem is caused by a port limit of a firewall, network address translation (NAT), application layer gateway (ALG) processing, or a limit of a proxy server, and furthermore, service data may be illegally eavesdropped or tampered because access of the Internet and the mobile Internet is dynamic and complicated. Based on the foregoing problems, how to implement secure traversing of service traffic and to ensure security and availability of converged communications services through a secure traversing solution is an essential factor for improving quality of converged communications services.

In the prior art, a network traversing solution based on a secure traversing gateway is provided, where the secure traversing gateway (STG) is deployed in a network of a carrier, an access capability of a hyper text transfer protocol (HTTP), a secure socket layer (SSL), an Internet protocol security (IPSec), a datagram transport layer security (DTLS) protocol, or a user datagram protocol (UDP) secure tunnel is provided, HTTP, SSL, IPSec, DTLS, and UDP secure tunnel client functions are implemented by a user service terminal, and various packets between a client and a converged communications server are transmitted through a negotiated HTTP, SSL, IPSec, DTLS, or UDP secure tunnel, thereby implementing traversing of network elements such as a firewall, a NAT, a proxy, a Web security gateway, and ensuring both security and a traversing capability of service data and quality of service.

However, in the prior art, the secure traversing gateway is deployed in a centralized manner in a core network of a converged communications carrier, and the converged communications carrier needs to purchase and maintain a secure traversing gateway device, so operating costs are high and expandability is poor.

SUMMARY

Embodiments of the present invention provide a method, an apparatus, and a system for providing a network traversing service, which have strong network expandability.

In a first aspect, an embodiment of the present invention provides a system for providing a network traversing service. The system comprises a resource management center and a secure traversing server. The resource management center receives a network traversing tunnel resource leasing request sent by a management server of a communication carrier. The network traversing tunnel resource leasing request includes information about a quantity of virtual access points to be leased and a quantity of users to be served by each of the virtual access points. A network traversing tunnel resource creating instruction is send to the secure traversing server according to the network traversing tunnel resource leasing request. The network traversing tunnel resource creating instruction comprises the information about the quantity of the virtual access points and the quantity of the users. The secure traversing server receives the network traversing tunnel resource creating instruction sent by the resource management center, and creates, according to the quantity of virtual access points and the quantity of the users, a network traversing tunnel resource that satisfies a leasing requirement of the communication carrier. The network traversing tunnel resource comprises a virtual access point and a service channel interconnected to the virtual access point. After creating the network traversing tunnel resource, the secure traversing server returns the information of the created network traversing tunnel resource to the resource management center. The information of the network traversing tunnel resource comprises virtual access point information and service channel information for providing tunneling for accessing a core network of the communication carrier. Then, the resource management center receives the information of the network traversing tunnel resource and sends the information of the network traversing tunnel resource to the management server of the communication carrier.

In a second aspect, an embodiment of the present invention provides a resource management center for providing a network traversing service to access a core network of a communication carrier. The resource management center comprises a communications interface and a processor. The communications interface communicates with a management server of the communication carrier and a secure traversing server. The processor receives a network traversing tunnel resource leasing request sent by the management server of the communication carrier. The network traversing tunnel resource leasing request includes information about a quantity of virtual access points to be leased and a quantity of users to be served by each of the virtual access points. The processor sends a network traversing tunnel resource creating instruction to the secure traversing server according to the network traversing tunnel resource leasing request. The network traversing tunnel resource creating instruction comprises the information about the quantity of the virtual access points and the quantity of the users to be served by each of the virtual access points. After receiving information of a network traversing tunnel resource created by the secure traversing server according to the number of virtual access points and the number of users, the processor sends the information of the network traversing tunnel resource to the management server of the communication carrier. The information of the network traversing tunnel resource comprises virtual access point information and service channel information for providing tunneling for accessing the core network of the communication carrier.

In a third aspect, an embodiment of the present invention provides a secure traversing server for providing a network traversing service to access a core network of a communication carrier. The secure traversing server comprises a communications interface and a processor. The communications interface communicates with a resource management center. The processor receives a network traversing tunnel resource creating instruction sent by the resource management center. The network traversing tunnel resource creating instruction comprises the information about a quantity of virtual access points needing to be leased by the communication carrier and a quantity of users to be served by each of the virtual access points. Then, the processor creates a network traversing tunnel resource that satisfies a leasing requirement of the communication carrier according to the quantity of the virtual access points and the quantity of the users, and returns the information of the created network traversing tunnel resource to the resource management center. The network traversing tunnel resource for providing tunneling for accessing a core network of the communication carrier comprises a virtual access point and a service channel interconnected to the virtual access point.

In a forth aspect, an embodiment of the present invention provides a method performed by a resource management center for providing a network traversing service to access a core network of a communication carrier. The resource management center receives a network traversing tunnel resource leasing request sent by a management server of the communication carrier. The network traversing tunnel resource leasing request includes information about a quantity of virtual access points to be leased and a quantity of users to be served by each of the virtual access points. Then, the resource management center sends a network traversing tunnel resource creating instruction to a secure traversing server according to the network traversing tunnel resource leasing request. The network traversing tunnel resource creating instruction comprises the information about the quantity of the virtual access points and the quantity of the users to be served by each of the virtual access points. After receiving the information of a network traversing tunnel resource created by the secure traversing server, the resource management center sends the information of the network traversing tunnel resource to the management server of the communication carrier. The information of the network traversing tunnel resource comprises virtual access point information and service channel information for providing tunneling for accessing the core network of the communication carrier.

In a fifth aspect, an embodiment of the present invention provides a method performed by a secure traversing server for providing a network traversing service to access a core network of a communication carrier. The secure traversing server receives a network traversing tunnel resource creating instruction sent by a resource management center. The network traversing tunnel resource creating instruction comprises information about a quantity of virtual access points needing to be leased by the communication carrier and a quantity of users to be served by each of the virtual access points. The secure traversing server creates a network traversing tunnel resource that satisfies a leasing requirement of the communication carrier according to the quantity of virtual access points and the quantity of the users, and returns information of the created network traversing tunnel resource to the resource management center. The network traversing tunnel resource for providing tunneling for accessing a core network of the communication carrier comprises a virtual access point and a service channel interconnected to the virtual access point.

In the method, the apparatus, and the system for providing a network traversing service provided in the embodiments of the present invention, the resource management center receives a network traversing tunnel resource leasing request sent by a management server of a communication carrier. The network traversing tunnel resource leasing request includes information about a quantity of virtual access points to be leased and a quantity of users to be served by each of the virtual access points. A network traversing tunnel resource creating instruction is send to the secure traversing server according to the network traversing tunnel resource leasing request. The network traversing tunnel resource creating instruction comprises the information about the quantity of the virtual access points and the quantity of the users. The secure traversing server receives the network traversing tunnel resource creating instruction sent by the resource management center, and creates, according to the quantity of the virtual access points and the quantity of the users, a network traversing tunnel resource that satisfies a leasing requirement of the communication carrier. The network traversing tunnel resource comprises a virtual access point and a service channel interconnected to the virtual access point. After creating the network traversing tunnel resource, the secure traversing server returns information of the created network traversing tunnel resource to the resource management center. The information of the network traversing tunnel resource comprises virtual access point information and service channel information for providing tunneling for accessing a core network of the communication carrier. Then, the resource management center receives the information of the network traversing tunnel resource and sends the information of the network traversing tunnel resource to the management server of the communication carrier. According to the method provided in the embodiments of the present invention, the management server of the carrier can provide the network traversing service for the terminal according to the virtual access point information and the service channel information, thereby solving a technical problem of poor network expandability brought about because the secure traversing gateway is deployed in a centralized manner in the core network of the carrier. Moreover, because the Security Traverse as a Service is provided as an operating mode, a Security Traverse as a Service (Security Traverse as a Service, STaaS) provider may be responsible for managing and operating a network traversing service resource in a unified manner, and a converged communications carrier may provide a network traversing service for a terminal user by leasing a network traversing service resource provided by the STaaS provider, thereby reducing operating costs of the converged communications carrier and improving network expandability of the carrier.

BRIEF DESCRIPTION OF DRAWINGS

To describe the technical solutions in the embodiments of the present invention or in the prior art more clearly, the following briefly introduces accompanying drawings required for describing the embodiments or the prior art. Apparently, the accompanying drawings in the following description show merely some embodiments of the present invention.

DESCRIPTION OF EMBODIMENTS

To make persons skilled in the art better understand the solutions of the present invention, the following clearly describes the technical solutions in the embodiments of the present invention with reference to the accompanying drawings in the embodiments of the present invention. Apparently, the embodiments to be described are merely part rather than all of the embodiments of the present invention.

Figure 1:
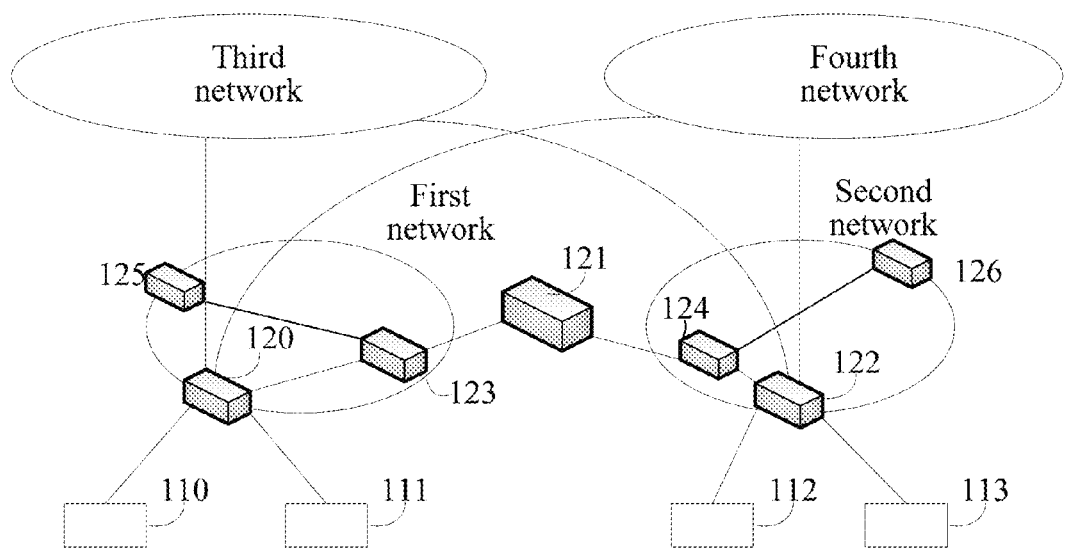
FIG. 1 is a diagram of an application scenario of a method for providing a network traversing service according to an embodiment of the present invention.

As shown in FIG. 1, FIG. 1 shows an application scenario of an embodiment of the present invention. For ease of description, in the embodiments of the present invention, a converged communications carrier is referred to as a carrier for short, and in a case without particular description, the carrier in the embodiments of the present invention is a converged communications carrier that is capable of providing a converged communications service. In the application scenario shown in FIG. 1, a first network may be an access network of a carrier A, a second network may be an access network of a carrier B, a third network may be a core network of the carrier A, and a fourth network may be a core network of the carrier B. A terminal 110 and a terminal 111 may traverse a virtual access point 120 to the third network or the fourth network, and a terminal 112 and a terminal 113 may traverse a virtual access point 122 to the third network or the fourth network. A network traversing tunnel resource management center 121 is responsible for collecting statistics about, managing, and allocating a network traversing tunnel resource, where the network traversing tunnel resource includes a virtual access point and a service channel interconnected to the virtual access point, the virtual access point is a virtualized secure traversing gateway, and is capable of providing an access capability of a hyper text transfer protocol (HTTP), a secure socket layer (SSL), an Internet protocol security (IPSec), a datagram transport layer security (DTLS) protocol, or a user datagram protocol (UDP) secure tunnel. For example, a data packet sent by the terminal 110 accesses the first network (the access network of the converged communications carrier A) from the virtual access point 120, and reaches the third network (the core network of the converged communications carrier A) through a service channel interconnected to the virtual access point 120, thereby achieving an objective that the terminal 110 accesses the core network of the converged communications carrier A.

A secure traversing server is a set of multiple virtual access points, may be deployed in an Internet data center (IDC) of a carrier, and provides a network traversing service for a terminal, so that the terminal can achieve an objective of accessing a core network of a carrier through a virtual access point selected by the secure traversing server. A secure traversing server 123 and a secure traversing server 124 are responsible for managing, establishing, and selecting a virtual access point. The secure traversing server 123 may create multiple virtual access points (namely, virtualized secure traversing gateways) according to a leasing request of a carrier, for example, the secure traversing server 123 may create the virtual access point 120 and a virtual access point 125, and the secure traversing server 124 may create the virtual access point 122 and a virtual access point 126. The virtual access point is generated through virtualization by the secure traversing server, and may be physically located on the secure traversing server. In FIG. 1, for clear description, the virtual access points and the secure traversing servers are shown and described separately. Multiple secure traversing servers and virtual access points form a network traversing service cloud, which provides a network traversing service for multiple carriers.

Figure 2:
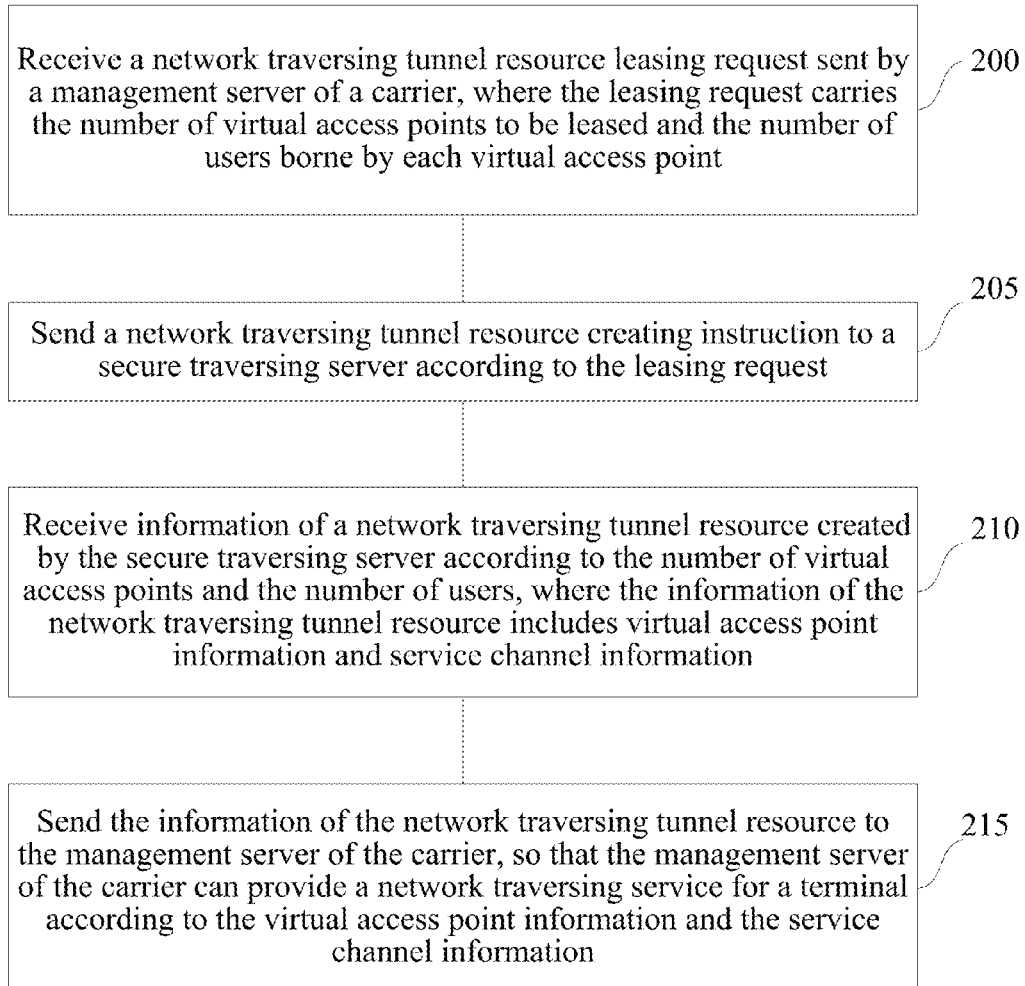
FIG. 2 is a flow chart of a method for providing a network traversing service according to an embodiment of the present invention.

FIG. 2 is a flow chart of a method for providing a network traversing service according to an embodiment of the present invention. The method may be executed by the resource management center 121 in the network system shown in FIG. 1. As shown in FIG. 2, the method includes:

Step 200: Receive a network traversing tunnel resource leasing request sent by a management server of a carrier, where the leasing request carries the number of virtual access points to be leased and the number of users borne by each virtual access point, and proceed to step 205.

In this embodiment of the present invention, to solve problems of high operating costs and poor network expandability brought about because the carrier maintains a secure traversing gateway, a network traversing tunnel resource is leased to the carrier in a service manner, a specialized service provider is responsible for managing and operating a network traversing service resource, and provides a network traversing service resource leasing service for the carrier through a resource management center, so that the carrier may lease a required network traversing tunnel resource through the Internet from the service provider according to an actual requirement of the carrier, and pays the service provider according to the number of leased services and a duration for using the leased services. Meanwhile, the carrier may also obtain, through the Internet, a service, such as maintenance, provided by the service provider for the network traversing tunnel resource, so that a terminal can achieve a network traversing objective of accessing a core network of the carrier through the network traversing tunnel resource leased by the carrier. This operating mode may be called a Security Traverse as a Service (STaaS) operating mode, and this service provider may be called an STaaS provider.

Specifically, in this step, when the carrier needs to lease a network traversing tunnel resource, the management server of the carrier sends the network traversing tunnel resource leasing request to the resource management center, where the management server of the carrier is a server set by the carrier and configured to manage a network traversing tunnel resource in a network of the carrier. The network traversing tunnel resource includes a virtual access point and a service channel interconnected to the virtual access point, where the virtual access point is configured for the terminal to access, and the service channel is configured to access a core network of a converged communications service carrier, so that the terminal can access the network of the carrier through the virtual access point, and access the core network of the carrier through the service channel. To satisfy a requirement of service traffic, the carrier may determine, according to the number of users in its network and an access requirement, a network traversing tunnel resource needing to be leased. Therefore, the network traversing tunnel resource leasing request needs to include the number of virtual access points to be leased and the number of users borne by each virtual access point, for example, a carrier A needs to lease 10 virtual access points, and each virtual access point can synchronously bear access requirements of 1000 users. Certainly, it may be understood that, the leasing request may further carry an identifier of the carrier, so that the resource management center can identify which carrier needs to lease the network traversing tunnel resource.

It may be understood that, in another case, the network traversing tunnel resource leasing request may carry the total number of users to be borne, and the resource management center determines, according to the total number of users, for the carrier the number of virtual access points needing to be leased and the number of users borne by each virtual access point.

Step 205: Send a network traversing tunnel resource creating instruction to a secure traversing server according to the leasing request, and proceed to step 210.

Specifically, after the resource management center receives the network traversing tunnel resource leasing request sent by the management server of the carrier, the resource management center may send the network traversing tunnel resource creating instruction to a secure traversing server managed by the resource management center according to the leasing request, to instruct the secure traversing server to create a network traversing tunnel resource according to the number of virtual access points and the number of users borne by each virtual access point, where the number of virtual access points and the number of users borne by each virtual access point are in the leasing request, and the network traversing tunnel resource includes a virtual access point interconnected to the terminal and a service channel interconnected to the core network of the carrier.

When the network has multiple secure traversing servers, the resource management center may check, according to the number of virtual access points and the total number of users needing to be borne, where the number of virtual access points and the total number of users needing to be borne are in the leasing request, idle resources of secure traversing servers managed by the resource management center, and send, according to areas where the secure traversing servers provide services and a load balancing principle, the network traversing tunnel resource creating instruction to a secure traversing server that is deployed in the network of the carrier and has the largest number of idle resources, to instruct the secure traversing server to create a network traversing tunnel resource.

Step 210: Receive information of the network traversing tunnel resource created by the secure traversing server according to the number of virtual access points and the number of users, where the information of the network traversing tunnel resource includes virtual access point information and service channel information, and proceed to step 215.

Specifically, after the secure traversing server completes virtualization creation of the access point and the service channel, the secure traversing server may associate the virtual access point with the service channel according to the identifier of the carrier, and return information of the created network traversing tunnel resource to the resource management center, where the information of the network traversing tunnel resource includes virtual access point information and service channel information. Specifically, the virtual access point information may include: information such as an address of the virtual access point, lessee information of the access point, a protocol type, and a tunnel number, and the service channel information includes: information such as an address of the service channel and a network segment which provides services and is in the core network, where the lessee information of the virtual access point may include information such as an identifier of a carrier to which the virtual access point belongs and a lessee number. It may be understood that, the secure traversing server may return the information of the network traversing tunnel resource to the resource management center in a manner of an information list.

Step 215: Send the information of the network traversing tunnel resource to the management server of the carrier, so that the management server of the carrier can provide a network traversing service for the terminal according to the virtual access point information and the service channel information.

It may be understood that, the resource management center may send the information of the network traversing tunnel resource to the management server of the carrier in a manner of an information list, so that the management server of the carrier can provide a network traversing service for the terminal according to the virtual access point information and the service channel information.

In the method for providing a network traversing service provided in this embodiment of the present invention, the secure traversing server is instructed, according to the received network traversing tunnel resource leasing request, to create the virtual access point and the service channel that are needed by the carrier, and the information of the created network traversing tunnel resource is returned to the management server of the carrier, so that the management server of the carrier can provide the network traversing service for the terminal according to the virtual access point information and the service channel information, thereby providing a security traverse as a service (STaaS) operating mode, so that the network traversing tunnel resource can be managed and maintained in a unified manner, thereby solving a technical problem of poor network expandability brought about because the secure traversing gateway is deployed in a centralized manner in the core network of the carrier, improving the network expandability of the carrier, and reducing operating costs of the carrier. Furthermore, reliability of network traversing may further be improved.

Figure 3:
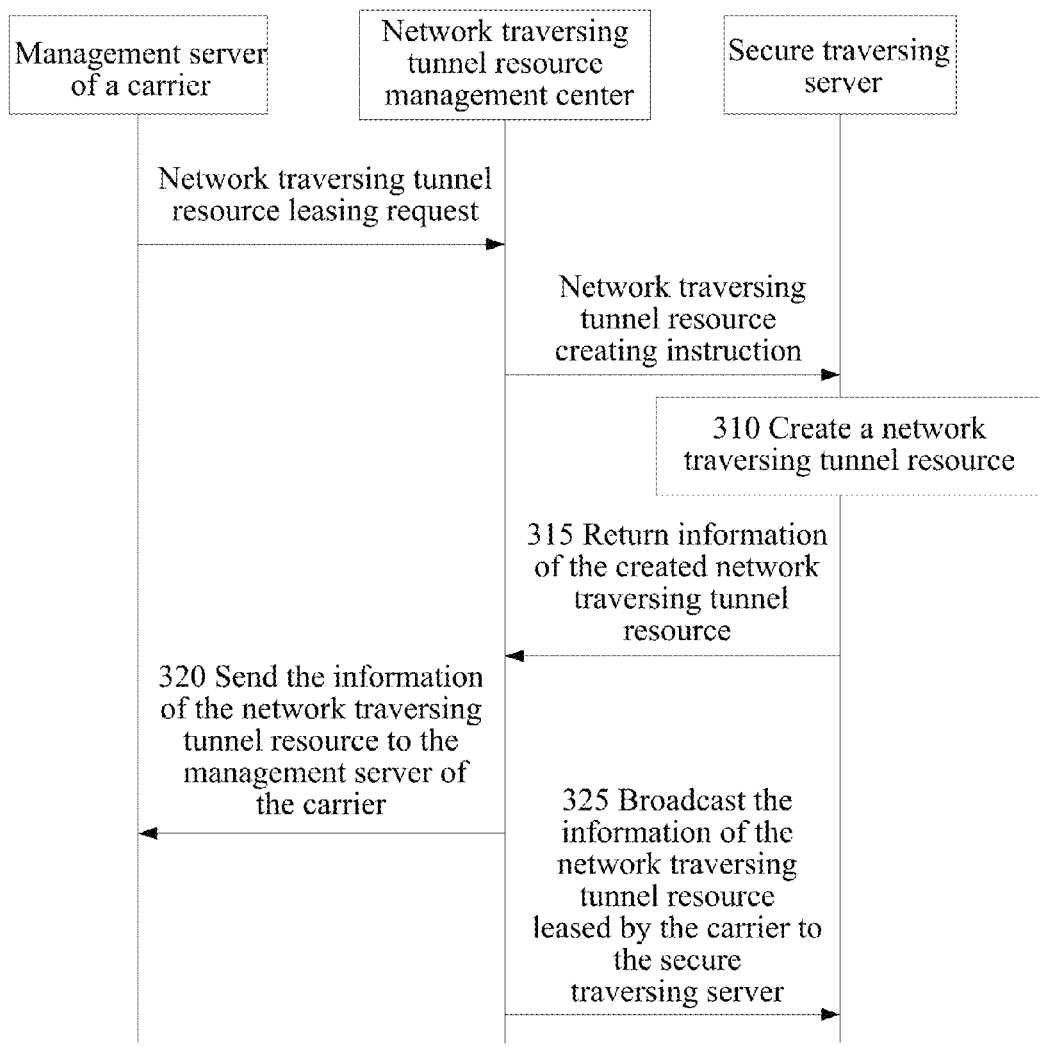
FIG. 3 is a signaling diagram of another method for providing a network traversing service according to an embodiment of the present invention.

FIG. 3 is a signaling diagram of another method for providing a network traversing service according to an embodiment of the present invention. As shown in FIG. 3, the method includes:

Step 300: A management server of a carrier sends a network traversing tunnel resource leasing request to a resource management center, where the leasing request carries an identifier of the carrier, the number of virtual access points to be leased, and the number of users borne by each virtual access point, and proceed to step 305.

The identifier of the carrier is used for the resource management center to identify the carrier sending the leasing request, for example, identify whether the leasing request is sent by a management server of China Mobile Communications Corporation (hereinafter referred to as "Mobile") or a management server of China Unicom (hereinafter referred to as "Unicom"). To satisfy a requirement of service traffic, the carrier may determine, according to a service requirement such as the number of users in its network and an access requirement, a network traversing tunnel resource needing to be leased, where the network traversing tunnel resource includes a virtual access point and a service channel. Therefore, the network traversing tunnel resource leasing request needs to include the number of virtual access points to be leased and the number of users borne by each virtual access point, for example, a carrier A needs to lease 10 virtual access points, and each virtual access point can synchronously bear access requirements of 1000 users. It may be understood that, because a service channel is interconnected to a virtual access point, the number of service channels may be equal to the number of virtual access points. Certainly, it may be understood that, the leasing request may further include other information such as an authentication certificate of the carrier, which is not limited here.

Step 305: The resource management center sends a network traversing tunnel resource creating instruction to a secure traversing server according to the leasing request, where the creating instruction carries the number of virtual access points and the number of users.

Specifically, after the resource management center receives the network traversing tunnel resource leasing request sent by the management server of the carrier, the resource management center may send a network traversing tunnel resource creating instruction to a secure traversing server managed by the resource management center according to the leasing request, to instruct the secure traversing server to create a network traversing tunnel resource according to the number of virtual access points and the number of users borne by each virtual access point, where the number of virtual access points and the number of users borne by each virtual access point are in the leasing request. It may be understood that, the resource creating instruction also carries the identifier of the carrier, the number of virtual access points, and the number of users. The network traversing tunnel resource includes a virtual access point interconnected to a terminal and a service channel interconnected to a core network of the carrier.

In one case, when the network has multiple secure traversing servers, the resource management center may check, according to the number of virtual access points and the total number of users needing to be borne, where the number of virtual access points and the total number of users needing to be borne are in the leasing request, idle resources of secure traversing servers managed by the resource management center, and select, according to areas where the secure traversing servers provide services and a load balancing principle, a secure traversing server that is deployed in the network of the carrier and has the largest number of idle resources to create a network traversing tunnel resource.

Step 310: The secure traversing server creates a network traversing tunnel resource according to the network traversing tunnel resource creating instruction.

Specifically, the secure traversing server creates, by adopting a virtualization technology and according to the network traversing tunnel resource creating instruction, a virtual access point and a service channel interconnected to the virtual access point that satisfy a leasing requirement, for example, may, through virtualization, allocate a virtual access point resource, configure an IP address or a domain name, and configure another parameter, so that each created virtual access point has functions of a secure traversing gateway, and can establish a virtual private network (VPN) tunnel with the terminal, and provide the terminal with an access capability of a VPN secure tunnel such as a hyper text transfer protocol (HTTP), a secure socket layer (SSL), an Internet protocol security (IPSec), a datagram transport layer security (DTLS) protocol, or a user datagram protocol (UDP) tunnel. Specifically, a virtual access point may receive a tunnel packet sent by the terminal through a VPN tunnel such as the HTTP tunnel, the SSL tunnel, the IPSec tunnel, the DTLS tunnel, or the UDP tunnel established with the terminal, send the received tunnel packet to a server of a core network of the carrier after decrypting and decapsulating the received tunnel packet, and send a response packet returned by the server of the core network of the carrier to the terminal through the VPN tunnel after encapsulating the response packet. Specifically, a packet may be transmitted between the virtual access point and the server of the core network of the carrier through a service channel interconnected to the virtual access point, namely, the virtual access point may communicate with the core network of the carrier according to an address of the service channel interconnected to the virtual access point. It should be noted that, the address of the service channel is an address of an ingress of the core network of the carrier.

It should be noted that, after the secure traversing server creates the virtual access point by adopting the virtualization technology, the virtual access point may have one-to-one, one-to-many, many-to-one, or many-to-many correspondence with a secure traversing server hardware device. The one-to-one correspondence belongs to a basic network traversing service deployment scenario. In the one-to-many correspondence, a hardware device performs traffic distribution, and acts as an agent of another secure traversing server of a same access point, so as to logically ensure that multiple secure traversing servers provide a service of the same access point outward. The many-to-one correspondence refers to that services of multiple virtual access points are started on a secure traversing server, and meanwhile, different virtual access points have lessee attributes, their respective independent authentication and authorization systems, core network resources, their respective independent networks that may be overlapped, routing tables, and virtual firewalls.

Step 315: The secure traversing server returns information of the created network traversing tunnel resource to the resource management center.

Specifically, after the secure traversing server receiving the network traversing tunnel resource creating instruction creates the network traversing tunnel resource for the carrier according to the number of virtual access points and the number of users, the secure traversing server may associate the virtual access point with the service channel according to the identifier which is of the carrier and is in the network traversing tunnel resource creating instruction, and return the information of the created network traversing tunnel resource to the resource management center, where the information of the network traversing tunnel resource includes virtual access point information and service channel information. Specifically, the information of the network traversing tunnel resource includes, but is not limited to, the identifier of the carrier, an address of the virtual access point, an address of the service channel, a network segment which provides services and is in the core network, and a tunnel number, where the address of the virtual access point may be an IP address and may also be a domain name, for example, 10.10.10.10 or cloud.com, and the address of the service channel interconnected to the virtual access point is the address of the core network of the carrier, so that the terminal may access the core network through the address of the service channel after accessing the network of the carrier through the virtual access point. It may be understood that, the address of the service channel may also be expressed by an IP address or a domain name, for example, 200.1.1.1 or cmcc.com. In addition, the information of the network traversing tunnel resource may further include: information such as a protocol type and a lessee number. It may be understood that, the secure traversing server may return the information of the network traversing tunnel resource to the resource management center in a manner of an information list, for example, the information list is shown in Table 1 in the following.

TABLE 1

| Identifier of a carrier | Lessee number | Address of a virtual access point | Address of a service channel | Protocol type | Tunnel number | Network segment |
|---|---|---|---|---|---|---|
| Mobile | 01 | 10.10.10.10 | 100.1.1.10 | HTTP | M01 | 200.1.1.20 |
| Mobile | 01 | 10.10.10.11 | 100.1.1.10 | DTLS | M02 | 200.1.1.30 |
| Mobile | 01 | 10.10.10.12 | 100.1.1.10 | UDP | M03 | 200.1.1.40 |
| Unicom | 02 | 10.10.10.15 | 200.1.1.10 | SSL | M05 | 192.168.1.10 |
| Unicom | 02 | cloud.com | 200.1.1.10 | IPSec | M06 | 192.168.1.20 |
| ... | | | | | | |

Step 320: The resource management center sends the information of the network traversing tunnel resource to the management server of the carrier.

Specifically, after the resource management center obtains the information of the network traversing tunnel resource created for the carrier, the resource management center sends the information of the network traversing tunnel resource created for the carrier to the management server of the carrier, where the information of the network traversing tunnel resource includes the virtual access point information and the service channel information, and may further include: information such as the protocol type, the lessee number, the tunnel number, and the network segment which provides services and is in the core network. Certainly, it may be understood that the resource management center may return the information of the network traversing tunnel resource to the management server of the carrier in a manner of the information list shown in Table 1, which is not repeatedly described here.

Step 325: The resource management center broadcasts the information of the network traversing tunnel resource leased by the carrier to the secure traversing server deployed in the network of the carrier.

Specifically, when multiple secure traversing servers are deployed in the network, after the secure traversing server receiving the network traversing tunnel resource creating instruction returns the created network traversing tunnel resource to the resource management center in step 315, in this step, the resource management center may manage the network traversing tunnel resource leased by the carrier, and send the information of the network traversing tunnel resource leased by the carrier to secure traversing servers deployed in the network of the carrier through a method such as broadcast, so that all the secure traversing servers deployed in the network of the carrier can provide a network traversing service for the terminal. It may be understood that, there is no sequence in executing step 320 and step 325.

In the method for providing a network traversing service provided in this embodiment of the present invention, the resource management center receives the network traversing tunnel resource leasing request sent by the management server of the carrier, the secure traversing server that is deployed in the IDC center of the carrier and has the largest number of idle resources creates the corresponding virtual access point and service channel, and the information of the network traversing tunnel resource is sent to all the secure traversing servers deployed in the network of the carrier, so that an all-round access service may be provided for the terminal through multiple secure traversing servers deployed in the network of the carrier, and the network traversing tunnel resource can be managed and maintained in a unified manner, thereby improving network expandability of the carrier and reliability of network traversing, and reducing operating costs of the carrier.

In one case, in the foregoing embodiments, the resource management center may further receive resource use state information which is of the virtual access point and is sent by the secure traversing server, and perform load balancing according to a load state of the secure traversing server.

Figure 4:
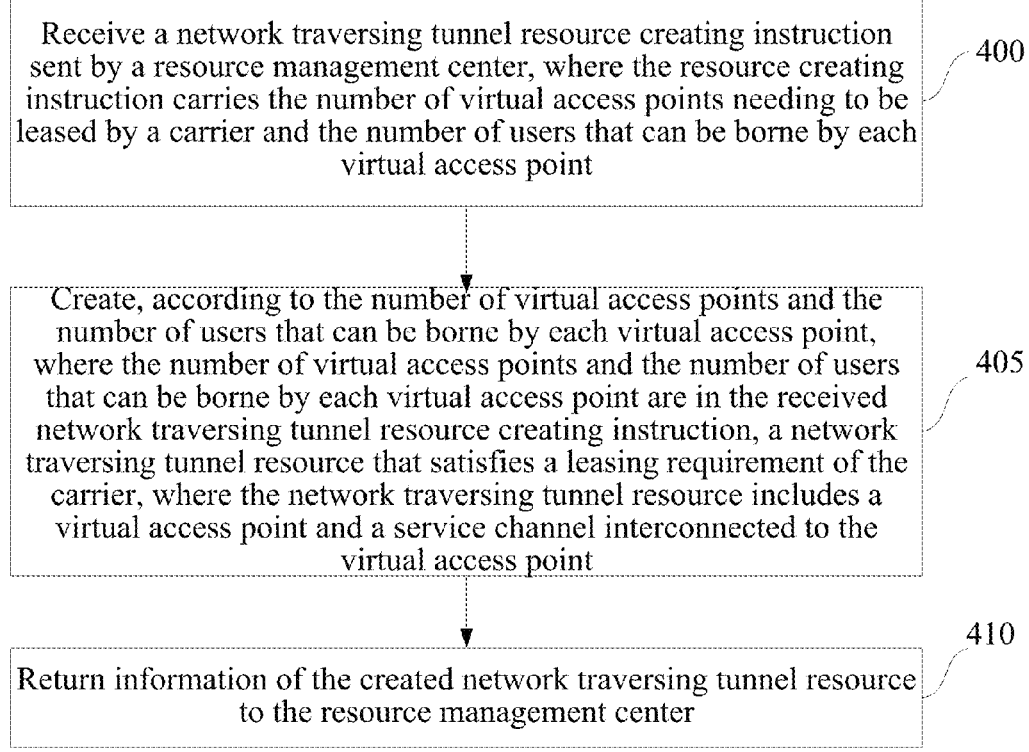
FIG. 4 is a flow chart of another method for providing a network traversing service according to an embodiment of the present invention.

FIG. 4 is a flow chart of another method for providing a network traversing service according to an embodiment of the present invention. The method described in this embodiment may be executed by the secure traversing server in FIG. 1, and in this embodiment, how to create a network traversing tunnel resource for a carrier according to a network traversing tunnel resource creating instruction of a resource management center and provide a network traversing service for a terminal is described from the perspective of a secure traversing server. Specifically, as shown in FIG. 4, the method may include:

Step 400: Receive a network traversing tunnel resource creating instruction sent by a resource management center, where the resource creating instruction carries the number of virtual access points needing to be leased by a carrier and the number of users that can be borne by each virtual access point, and proceed to step 405.

Optionally, an identifier of the carrier may be further carried, where the identifier of the carrier is used to identify the carrier. After receiving the network traversing tunnel resource creating instruction, the secure traversing server may create a network traversing tunnel resource for the carrier according to the number of virtual access points to be created and the number of users that can be borne by each virtual access point, where the network traversing tunnel resource includes a virtual access point interconnected to a terminal and a service channel interconnected to a core network of the carrier.

Step 405: Create, according to the number of virtual access points and the number of users that can be borne by each virtual access point, where the number of virtual access points and the number of users that can be borne by each virtual access point are in the received network traversing tunnel resource creating instruction, a network traversing tunnel resource that satisfies a leasing requirement of the carrier, where the network traversing tunnel resource includes a virtual access point and a service channel interconnected to the virtual access point, and proceed to step 410.

Specifically, the secure traversing server creates, by adopting a virtualization technology and according to the network traversing tunnel resource creating instruction, a virtual access point and a service channel interconnected to the virtual access point that satisfy a leasing requirement, for example, may, through virtualization, allocate a virtual access point resource, configure an IP address or a domain name, and configure another parameter, so that each created virtual access point has functions of a secure traversing gateway, and can establish a VPN tunnel with the terminal, and provide the terminal with an access capability of a VPN secure tunnel such as an HTTP, an SSL, an IPSec, a DTLS, or a UDP tunnel. Specifically, a virtual access point may receive a tunnel packet sent by the terminal through a VPN tunnel such as the HTTP tunnel, the SSL tunnel, the IPSec tunnel, the DTLS tunnel, or the UDP tunnel established with the terminal, send the received tunnel packet to a server of a core network of the carrier after decrypting and decapsulating the received tunnel packet, and send a response packet returned by the server of the core network of the carrier to the terminal through the VPN tunnel after encapsulating the response packet. Specifically, a packet may be transmitted between the virtual access point and the server of the core network of the carrier through a service channel interconnected to the virtual access point, namely, the virtual access point may communicate with the core network of the carrier according to an address of the service channel interconnected to the virtual access point. It should be noted that, the address of the service channel is an address of an ingress of the core network of the carrier.

Step 410: Return information of the created network traversing tunnel resource to the resource management center.

Specifically, the secure traversing server may associate the virtual access point with the service channel according to the identifier which is of the carrier and is in the network traversing tunnel resource creating instruction, and return the information of the created network traversing tunnel resource to the resource management center, where the information of the network traversing tunnel resource includes virtual access point information and service channel information. Specifically, the information of the network traversing tunnel resource includes, but is not limited to, the identifier of the carrier, an address of the virtual access point, an address of the service channel, a network segment which provides services and is in the core network, and a tunnel number, where the address of the virtual access point may be an IP address and may also be a domain name, for example, 10.10.10.10 or cloud.com, and the address of the service channel interconnected to the virtual access point is the address of the core network of the carrier, so that the terminal may access the core network through the address of the service channel after accessing the network of the carrier through the virtual access point. It may be understood that, the address of the service channel may also be expressed by an IP address or a domain name, for example, 200.1.1.1 or cmcc.com. In addition, the information of the network traversing tunnel resource may further include: information such as a protocol type and a lessee number. It may be understood that, the secure traversing server may return the information of the network traversing tunnel resource to the resource management center in a manner of an information list, which is not limited here.

The method for creating a network traversing tunnel resource provided in this embodiment of the present invention is described from the perspective of a secure traversing server side, and for specific implementation details, reference may be made to description of the corresponding processes in the embodiments of FIG. 2 and FIG. 3 which are described from the perspective of the resource management center, which are not repeatedly described here.

In the method for creating a network traversing tunnel resource provided in this embodiment of the present invention, the network traversing tunnel resource that satisfies the leasing requirement of the carrier may be created for the carrier according to the network traversing tunnel resource creating instruction sent by the resource management center, so that the carrier can provide a network traversing service for the terminal according to the leased network traversing tunnel resource, thereby improving network expandability of the carrier and reliability of network traversing, and reducing operating costs of the carrier.

Figure 5:
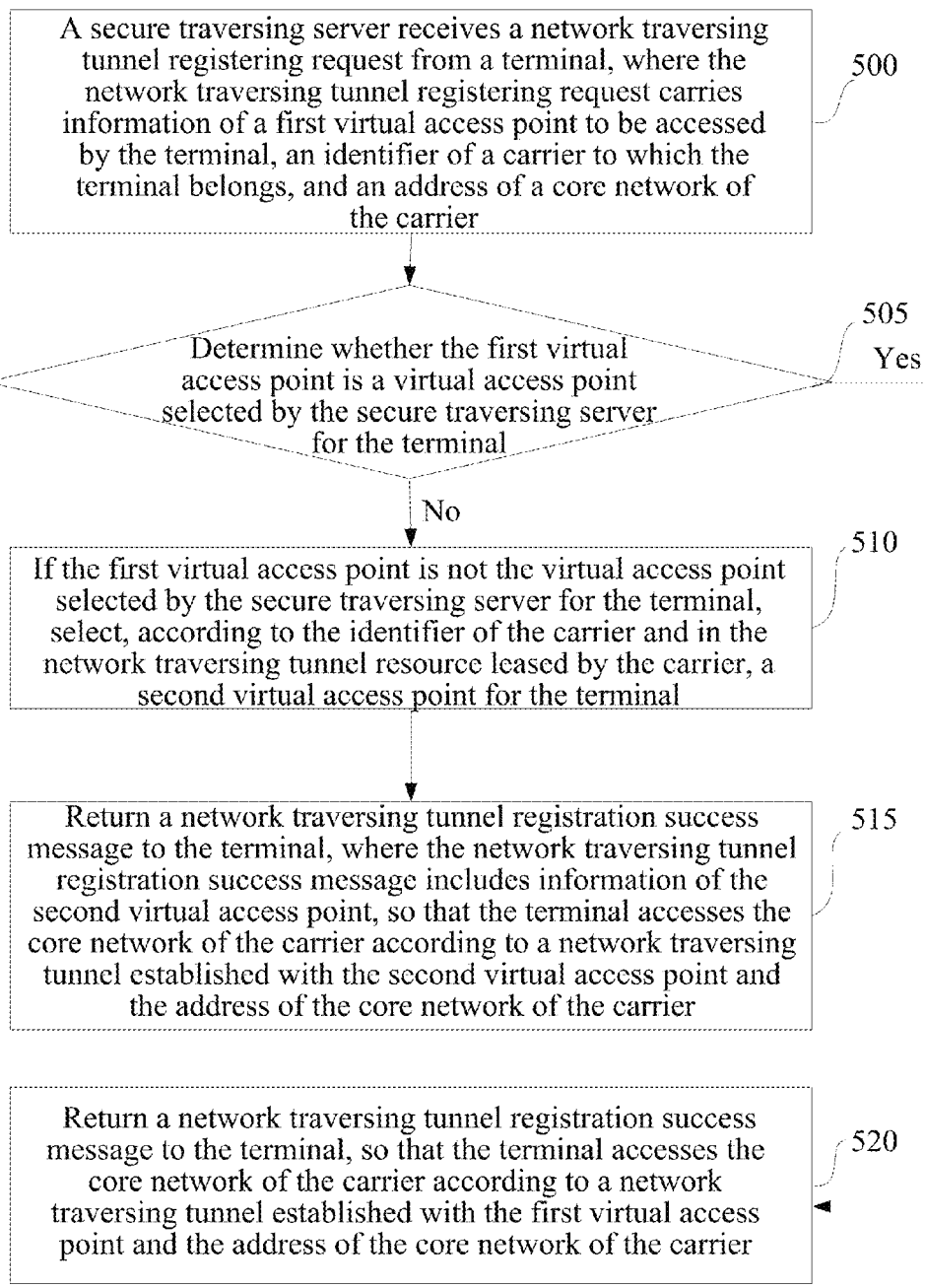
FIG. 5 is a flow chart of another method for providing a network traversing service according to an embodiment of the present invention.

FIG. 5 is a flow chart of another method for providing a network traversing service according to an embodiment of the present invention. The method described in this embodiment may also be executed by the secure traversing server in FIG. 1, and in this embodiment, how to provide a network traversing service for a terminal through a leased network traversing tunnel resource is described from the perspective of a secure traversing server. As shown in FIG. 5, the method includes:

Step 500: Receive a network traversing tunnel registering request from a terminal, where the network traversing tunnel registering request carries information of a first virtual access point to be accessed by the terminal, an identifier of a carrier to which the terminal belongs, and an address of a core network of the carrier, and proceed to step 505.

In this step, a terminal 110 is still taken as an example. To traverse the Internet to access the core network of the carrier, the terminal 110 may directly send a network traversing tunnel registering request to a network traversing service cloud. Specifically, the terminal 110 sends a network traversing tunnel registering request to a secure traversing server 123, where the network traversing tunnel registering request carries the information of the first virtual access point to be accessed by the terminal, the identifier of the carrier to which the terminal belongs, and the address of the core network of the carrier, and the first virtual access point is a virtual access point randomly selected by the terminal, for example, a virtual access point 120.

In addition, the network traversing tunnel registering request may further include lessee information, a user name, a password, and terminal type information, where the terminal type information includes information such as a model of a mobile terminal, a version of an operating system, and a version of a browser, so that the secure traversing server performs access authentication on the terminal.

Step 505: Determine whether the first virtual access point is a virtual access point selected by the secure traversing server for the terminal, and if the first virtual access point is not the selected virtual access point, proceed to step 510; otherwise, proceed to step 520.

Specifically, the secure traversing server may determine, according to the information which is of the first virtual access point and is in the network traversing tunnel registering request, whether the first virtual access point is a preferable virtual access point selected by the secure traversing server for the terminal. Specifically, the secure traversing server may determine, according to a set record table, whether the first virtual access point is the virtual access point selected by the secure traversing server for the terminal, where the record table records a use state of a virtual access point. If not, it indicates that the terminal performs access for the first time, and the first virtual access point is a virtual access point randomly selected by the terminal, and may not be an optimal virtual access point selected by the secure traversing server for the terminal. In addition, the secure traversing server may also determine, according to an access position, a load amount, or a probe response situation of the first virtual access point, whether the first virtual access point is the optimal virtual access point selected by the secure traversing server for the terminal. If not, proceed to step 510; otherwise, proceed to step 520.

It may be understood that, in one case, if the carrier to which the terminal belongs leases multiple virtual access points, it is required to determine whether the first virtual access point in the network traversing tunnel registering request is a preferable virtual access point selected by the secure traversing server for the terminal, and when the first virtual access point is not the selected first virtual access point, proceed to step 510 to select a virtual access point for the terminal. In another case, if the terminal is in a roaming state, and the first virtual access point in the network traversing tunnel registering request is not the virtual access point leased by the carrier to which the terminal belongs, it is required to proceed to step 510 where the secure traversing server reselects a virtual access point for the terminal. In another case, if the carrier leases only one virtual access point, the terminal is not in a roaming state, and the terminal of the carrier can perform access only according to this virtual access point leased by the carrier, the first virtual access point is the selected access point. In this case, proceed to step 520.

Step 510: Select, according to the identifier of the carrier and in the network traversing tunnel resource leased by the carrier, a second virtual access point for the terminal, and proceed to step 515.

In this step, the secure traversing server may, according to the identifier which is of the carrier and is in the leasing request, search for information of the network traversing tunnel resource leased by the carrier, and select a virtual access point for the terminal. Specifically, the information of the network traversing tunnel resource includes: lessee information of the virtual access point, a user load amount of the virtual access point, and an access area of the virtual access point. Preferably, the optimal virtual access point may be selected according to the information which is of the network traversing tunnel resource and is obtained through querying. Specifically, when the optimal virtual access point is selected, a virtual access point that has a smallest load amount, or a closest access position, or a fastest probe response may be selected as the optimal virtual access point according to the information of the network traversing tunnel resource. Certainly, after selecting the virtual access point for the terminal, the secure traversing server records related information or puts a corresponding identifier, so that when receiving a network traversing tunnel registering request of the terminal next time, the secure traversing server may quickly determine whether the first virtual access point in the terminal is the selected virtual access point.

Step 515: Return a network traversing tunnel registration success message to the terminal, where the network traversing tunnel registration success message includes information of the second virtual access point, so that the terminal accesses the core network of the carrier according to a network traversing tunnel established with the second virtual access point and the address of the core network of the carrier.

Specifically, in one case, after the authentication performed by the secure traversing server on the terminal succeeds, the secure traversing server may directly return a network traversing tunnel registration success message to the terminal, where the network traversing tunnel registration success message includes a registration result and the information of the second virtual access point selected by the secure traversing server for the terminal, and complete negotiation on a network traversing tunnel between the terminal and the second virtual access point, so that the terminal may access the core network of the carrier according to the network traversing tunnel established with the second virtual access point and the address of the core network of the carrier. Specifically, the second virtual access point may receive, through the network traversing tunnel established with the terminal, a packet sent by the terminal, and send the packet to the core network of the carrier after decapsulating the packet; and receive a response packet returned by the core network of the carrier, and send the response packet to the terminal through the network traversing tunnel after encapsulating the response packet. The terminal may communicate with the core network of the carrier through a virtual IP address allocated by the second virtual access point to the terminal. Specifically, the encapsulated packet includes the virtual IP address allocated by the second virtual access point to the terminal and the address of the core network of the carrier, and an encapsulated outer packet includes an IP address of the terminal and the IP address of the second virtual access point. It should be noted that, the network traversing tunnel established between the second virtual access point and the terminal may be a VPN secure tunnel of a type such as the HTTP, SSL, IPSec, DTLS, or UDP, which is not listed one by one here.

In another case, the secure traversing server may return a registration failure message to the terminal, where the registration failure message includes the information of the second virtual access point selected for the terminal, so that the terminal can re-initiate a network traversing tunnel registering request according to the information of the second virtual access point.

Step 520: Return a network traversing tunnel registration success message to the terminal, so that the terminal accesses the core network of the carrier according to a network traversing tunnel established with the first virtual access point and the address of the core network of the carrier.

In a case that the first virtual access point is the virtual access point selected by the secure traversing server for the terminal, when the authentication performed by the secure traversing server on the terminal succeeds, the secure traversing server returns a network traversing tunnel registration success message to the terminal, and completes negotiation on a network traversing tunnel between the terminal and the first virtual access point, so that the terminal can access the core network of the carrier according to the network traversing tunnel established with the first virtual access point and the address of the core network of the carrier. Specifically, the network traversing tunnel registration success message includes a registration result, and may further include information such as a virtual Internet protocol IP address and mask, a sending period of a packet for keeping connection, and an access policy. A secure tunnel may include: a VPN secure tunnel of a type such as the HTTP, SSL, DTLS, UDP, or UDPS, which is not listed one by one here.

In the method for providing a network traversing service provided in this embodiment of the present invention, the secure traversing server deployed in the network of the carrier selects the virtual access point for the terminal of the carrier according to the information of the network traversing tunnel resource leased by the carrier, and directly carries the information of the second virtual access point selected for the terminal in the network traversing tunnel registration success message returned to the terminal, so that the terminal does not need to re-initiate a network traversing tunnel registering request according to the information of the selected second virtual access point, thereby improving access efficiency of the terminal. Moreover, the virtual access point is the optimal virtual access point after the selection of the server, and different terminals may implement network traversing through different selected virtual access points, so a burden of a traversing gateway is reduced, and reliability of network traversing is improved. In addition, the virtual access point is leased by the carrier, and the carrier may lease multiple virtual access points according to a service requirement, so operating costs of the carrier are reduced.

Figure 6:
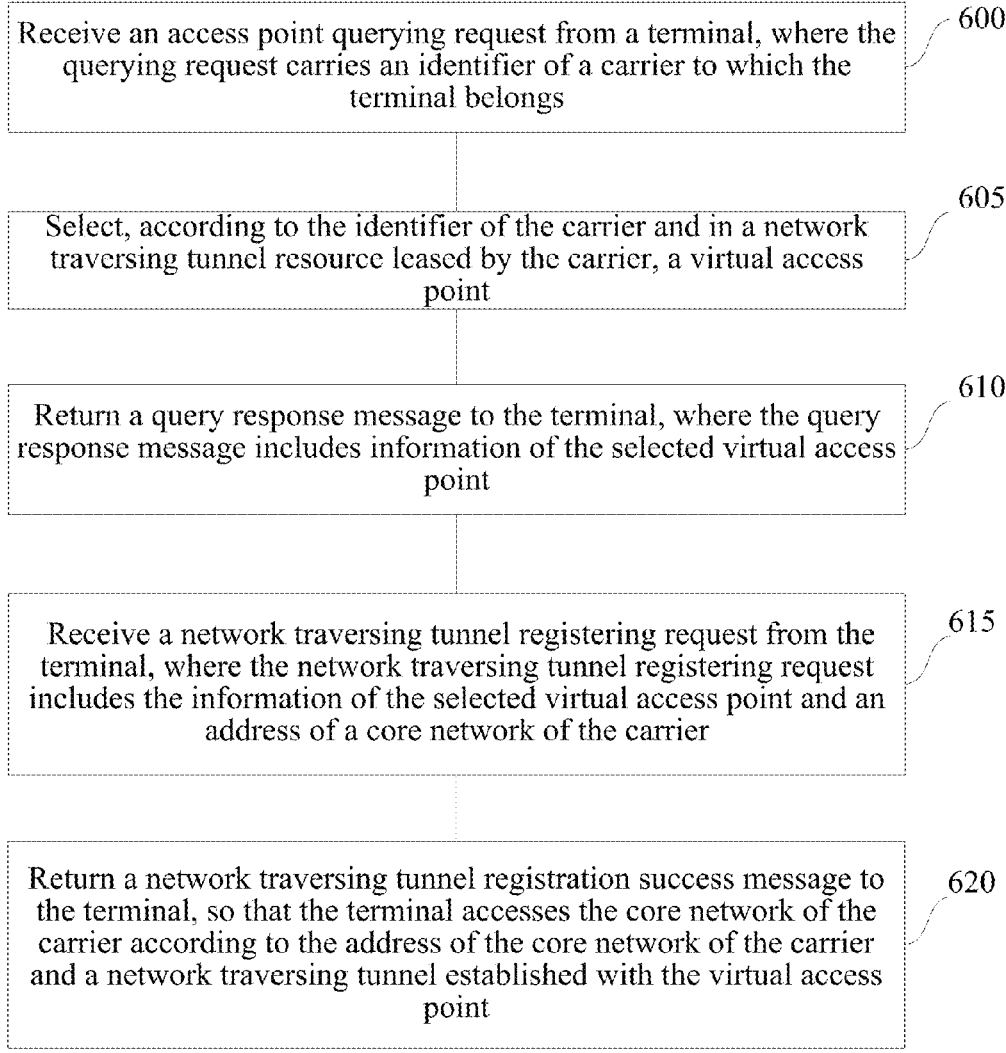
FIG. 6 is a flow chart of another method for providing a network traversing service according to an embodiment of the present invention.

FIG. 6 is a flow chart of another method for providing a network traversing service according to an embodiment of the present invention. The method described in this embodiment may also be executed by the secure traversing server in FIG. 1, and in this embodiment, how to provide a network traversing service for a terminal through a leased network traversing tunnel resource is described from the perspective of a secure traversing server. As shown in FIG. 6, the method includes:

Step 600: Receive an access point querying request from a terminal, where the querying request carries an identifier of a carrier to which the terminal belongs.

In this step, a terminal 110 in FIG. 1 is taken as an example. The terminal 110 needs to traverse the Internet network to access a third network or a fourth network, where the third network or the fourth network is a core network of the carrier. In this case, the terminal 110 needs to send an access point querying request to a network traversing service cloud, which is used to query for an access point for accessing a network of the carrier. Specifically, the terminals 110 may send an access point querying request to a secure traversing server 123 deployed in the network of the carrier, where the access point querying request indicates the identifier of the carrier to which the terminal belongs.

In one case, if the carrier leases only one virtual access point, a terminal in the network of the carrier may directly establish a tunnel with the one virtual access point leased by the carrier, access the core network of the carrier through the tunnel, and does not need to perform the step of querying for a virtual access point. However, in actual application, one virtual access point is far away from satisfying access requirements of users, and therefore, the carrier usually leases multiple virtual access points from an STaaS service provider according to the number of users in the network. In this case, in order to obtain a better service, a user may initiate a virtual access point querying request to query for a preferable virtual access point. Specifically, the querying request may further include an initial access point of the user and an address of the core network which is of the carrier and is to be accessed.

Step 605: Select, according to the identifier of the carrier and in a network traversing tunnel resource leased by the carrier, a virtual access point.

In this step, the secure traversing server may, according to the identifier which is of the carrier and is in the leasing request, search for information of the network traversing tunnel resource leased by the carrier, and select a virtual access point for the terminal. Specifically, a virtual access point may be selected for the terminal according to virtual access point information in the information of the network traversing tunnel resource, where the virtual access point information may specifically include: lessee information of the virtual access point, a user load amount of the virtual access point, and an access area of the virtual access point. Preferably, a virtual access point that has a smallest load amount, or a closest access position, or a fastest probe response may be selected according to the information which is of the network traversing tunnel resource and is obtained through querying. For example, in this embodiment, that a first virtual access point 120 is selected is taken as an example for description. It may be understood that, after selecting the virtual access point for the terminal, the secure traversing server records related information or puts a corresponding identifier.

Step 610: Return a query response message to the terminal, where the query response message includes information of the selected virtual access point.

Specifically, after selecting, according to the identifier of the carrier and in the network traversing tunnel resource leased by the carrier, the virtual access point for the terminal, the secure traversing server may return a query response message to the terminal, where the query response message includes the information of the selected virtual access point.

Step 615: Receive a network traversing tunnel registering request from the terminal, where the network traversing tunnel registering request includes the information of the selected virtual access point and the address of the core network of the carrier.

After receiving the information which is of the selected virtual access point and is returned by the secure traversing server, the terminal may initiate a network traversing tunnel registering request to the virtual access point. Because the secure traversing server is a set of virtual access points, the secure traversing server receives the network traversing tunnel registering request initiated by the terminal according to the selected virtual access point, where the network traversing tunnel registering request includes the information of the selected virtual access point and the address of the core network of the carrier. In addition, the network traversing tunnel registering request may further include lessee information, a user name, a password, and terminal type information, where the terminal type information includes information such as a model of a mobile terminal, a version of an operating system, and a version of a browser, so that the secure traversing server performs access authentication on the terminal.

It should be noted that, in one case, when the carrier leases only one virtual access point, the virtual access point is the virtual access point selected by the secure traversing server, and the terminal in the network of the carrier may directly initiate a network traversing tunnel registering request to the virtual access point.

Step 620: Return a network traversing tunnel registration success message to the terminal, so that the terminal accesses the core network of the carrier according to the address of the core network of the carrier and a network traversing tunnel established with the virtual access point.

When the authentication performed by the secure traversing server on the terminal succeeds, the secure traversing server returns a network traversing tunnel registration success message to the terminal, and completes negotiation on a network traversing tunnel. The network traversing tunnel registration success message includes a registration result, and may further include information such as a virtual Internet protocol IP address and mask, a sending period of a packet for keeping connection, and an access policy. A secure tunnel may include: a VPN secure tunnel of a type such as an HTTP, an SSL, a DTLS, a UDP, or a UDPS, which is not listed one by one here.

It should be noted that, the foregoing embodiments shown in FIG. 5 and FIG. 6 may further include: collecting statistics about a resource use state of the virtual access point created by the secure traversing server, and sending the resource use state of the virtual access point created by the secure traversing server to a resource management center, so as to manage the virtual access point created by the secure traversing server. Specifically, the managing the virtual access point includes performing load balancing on the virtual access point according to a resource load state of the virtual access point.

In the method for providing a network traversing service described in this embodiment of the present invention, the secure traversing server deployed in the network of the carrier receives the access point querying request from the terminal, selects, in the network traversing tunnel resource leased by the carrier, the virtual access point for the terminal, and sends access information of the selected virtual access point to the terminal, so that the terminal establishes a network traversing tunnel with the selected virtual access point according to the access information of the selected virtual access point, thereby accessing the core network of the carrier according to the established network traversing tunnel, and implementing network traversing. The virtual access point is an optimal virtual access point after the selection of the server, and different terminals may implement network traversing through different selected virtual access points, so a burden of a traversing gateway is reduced, and reliability of network traversing is improved. Moreover, the virtual access point is leased by the carrier, and the carrier may lease multiple virtual access points according to a service requirement, so that not only operating costs of the carrier are reduced, and but also the carrier can provide a better network traversing service for the terminal according to the multiple leased virtual access points, thereby improving reliability of network traversing.

It should be noted that, the foregoing embodiments shown in FIG. 4, FIG. 5, and FIG. 6 may all be executed by a secure traversing server, and the foregoing three embodiments may be executed by the secure traversing server separately, and may also be executed in combination.

Figure 7:
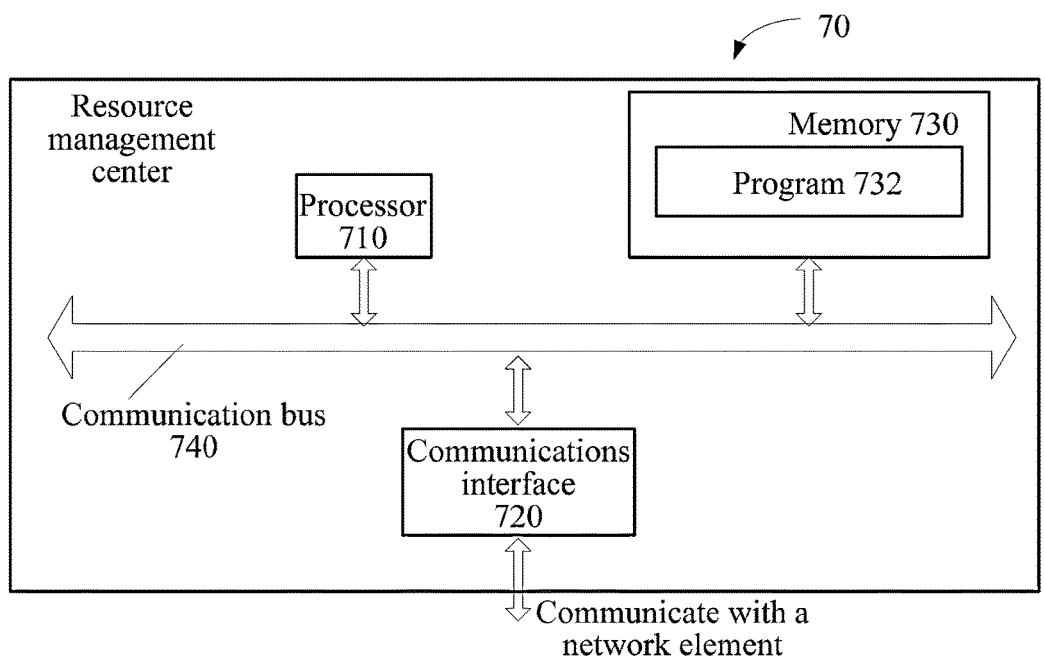
FIG. 7 is a schematic diagram of a physical structure of a resource management center according to an embodiment of the present invention.

FIG. 7 is a schematic diagram of a physical structure of a resource management center according to an embodiment of the present invention. The resource management center may be a server, a computer, or a computing node having computing and processing capabilities, as long as it can implement unified management on a network traversing tunnel resource, which is not particularly limited here. As shown in FIG. 7, the resource management center 70 includes:

a processor 710, a communications interface 720, a memory 730, and a communication bus 740.

The processor 710, the communications interface 720, and the memory 730 communicate with each other through the communication bus 740.

The communications interface 720 is configured to communicate with a network element, for example, a management server of a carrier or a secure traversing server.

The processor 710 is configured to execute a program 732, and may specifically execute related steps in the method embodiments shown in FIG. 2 to FIG. 3.

Specifically, the program 732 may include a program code, where the program code includes a computer operation instruction.

The processor 710 may be a central processing unit CPU, or an application specific integrated circuit ASIC (Application Specific Integrated Circuit), or be configured to one or more integrated circuits implementing the embodiments of the present invention.

The memory 730 is configured to store the program 732. The memory 730 may include a high-speed RAM memory, and may further include a non-volatile memory (non-volatile memory), for example, at least one disk memory.

For specific implementation of functional modules in the program 732, reference may be made to corresponding modules in the following embodiment shown in FIG. 8, which is not described here.

Figure 8:
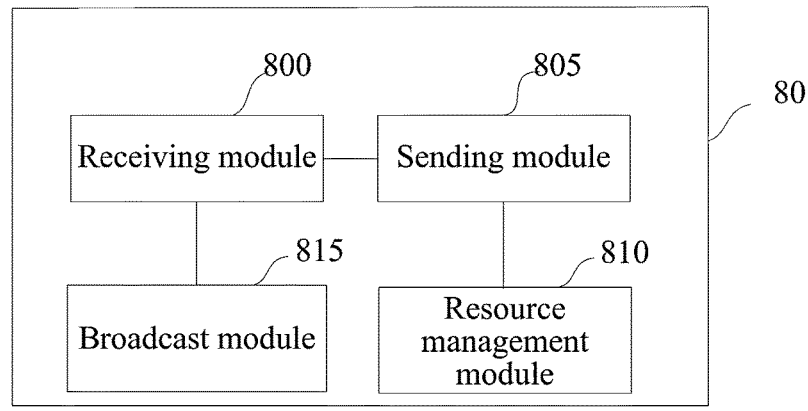
FIG. 8 is a schematic structural diagram of another resource management center according to an embodiment of the present invention.

FIG. 8 is a schematic structural diagram of a resource management center according to an embodiment of the present invention. As shown in FIG. 8, the resource management center 80 includes:

A receiving module 800 is configured to receive a network traversing tunnel resource leasing request sent by a management server of a carrier, where the leasing request carries the number of virtual access points to be leased and the number of users borne by each virtual access point.

Specifically, to satisfy a requirement of service traffic, the carrier may determine, according to the number of users in its network and an access requirement, a network traversing tunnel resource needing to be leased. Therefore, the network traversing tunnel resource leasing request needs to include the number of virtual access points to be leased and the number of users borne by each virtual access point, for example, a carrier A needs to lease 10 virtual access points, and each virtual access point can synchronously bear access requirements of 1000 users. Certainly, it may be understood that, the leasing request may further carry an identifier of the carrier, so that the resource management center can identify which carrier needs to lease the network traversing tunnel resource.

It may be understood that, in another case, the network traversing tunnel resource leasing request may carry only the total number of users to be borne, and the resource management center determines, according to the total number of users, for the carrier the number of virtual access points needing to be leased and the number of users borne by each virtual access point.

A sending module 805 is configured to send a network traversing tunnel resource creating instruction to a secure traversing server according to the leasing request received by the receiving module 800, where the network traversing tunnel resource creating instruction includes the number of virtual access points and the number of users.

Specifically, after the receiving module 800 receives the network traversing tunnel resource leasing request sent by the management server of the carrier, the sending module 805 may send a network traversing tunnel resource creating instruction to a secure traversing server managed by the resource management center according to the leasing request, to instruct the secure traversing server to create a network traversing tunnel resource according to the number of virtual access points and the number of users borne by each virtual access point, where the number of virtual access points and the number of users borne by each virtual access point are in the leasing request, and the network traversing tunnel resource includes a virtual access point interconnected to a terminal and a service channel interconnected to a core network of the carrier.

When the network has multiple secure traversing servers, the sending module 805 may check, according to the number of virtual access points and the total number of users needing to be borne, where the number of virtual access points and the total number of users needing to be borne are in the leasing request, idle resources of secure traversing servers managed by the resource management center, and select, according to areas where the secure traversing servers provide services and a load balancing principle, a secure traversing server that is deployed in the network of the carrier and has the largest number of idle resources to create a network traversing tunnel resource.

The receiving module 800 is further configured to receive information of a network traversing tunnel resource created by the secure traversing server according to the number of virtual access points and the number of users, where the number of virtual access points and the number of users are in the network traversing tunnel resource creating instruction, and the information of the network traversing tunnel resource includes virtual access point information and service channel information.

Specifically, after the secure traversing server completes virtualization creation of the access point and the service channel, the secure traversing server may associate the virtual access point with the service channel according to the identifier of the carrier, and return information of the created network traversing tunnel resource to the receiving module 800, where the information of the network traversing tunnel resource includes the virtual access point information and the service channel information. Specifically, the information of the network traversing tunnel resource includes, but is not limited to, an identifier of the carrier, an address of the virtual access point, an address of the service channel, a network segment providing services, and a lessee number. The address of the virtual access point may be an IP address and may also be a domain name, for example, 10.10.10.10 or cloud.com, and the address of the service channel interconnected to the virtual access point is the address of the core network of the carrier, so that the terminal may access the core network through the address of the service channel after accessing the network of the carrier through the virtual access point. It may be understood that, the address of the service channel may also be expressed by an IP address or a domain name, for example, 200.1.1.1 or cmcc.com. In addition, the information of the network traversing tunnel resource may further include: information such as a protocol type and a tunnel number. It may be understood that, the secure traversing server may return the information of the network traversing tunnel resource to the receiving module 800 in a manner of an information list.

The sending module 805 is further configured to send the information of the network traversing tunnel resource to the management server of the carrier, so that the management server of the carrier can provide a network traversing service for the terminal according to the virtual access point information and the service channel information.

It may be understood that, the sending module 805 may send the information of the network traversing tunnel resource to the management server of the carrier in a manner of an information list, so that the management server of the carrier can provide a network traversing service for the terminal according to the virtual access point information and the service channel information.

In addition, in one case, the resource management center 80 provided in this embodiment of the present invention may further include:

A resource management module 810 is configured to manage and maintain the network traversing tunnel resource.

The resource management module 810 may manage and maintain the network traversing tunnel resource according to a use state of a virtual access point in the network traversing tunnel resource. Specifically, the resource management module 810 may receive resource use state information which is of the virtual access point and is sent by the secure traversing server, and perform load balancing according to a load state of the secure traversing server, and may further broadcast the information of the network traversing tunnel resource leased by the carrier to the secure traversing server deployed in the network of the carrier, thereby providing an all-round access service for the terminal through multiple secure traversing servers deployed in the network of the carrier, and balancing load amounts of virtual access points.

A broadcast module 815 is configured to send the information of the network traversing tunnel resource leased by the carrier to the secure traversing server deployed in the network of the carrier.

When multiple secure traversing servers are deployed in the network, the broadcast module 815 may send the information of the network traversing tunnel resource leased by the carrier to the secure traversing servers deployed in the network of the carrier, so that all the secure traversing servers deployed in the network of the carrier can provide a network traversing service for the terminal.

In the resource management center provided in this embodiment of the present invention, the network traversing tunnel resource leasing request sent by the management server of the carrier is received, the secure traversing server deployed in the network of the carrier is instructed to create the corresponding virtual access point and service channel, and the information of the created network traversing tunnel resource is returned to the management server of the carrier, so that the management server of the carrier can provide a network traversing service for the terminal according to the virtual access point information and the service channel information. Therefore, a security traverse as a service (STaaS) operating mode is provided, so that the network traversing tunnel resource can be managed and maintained in a unified manner, thereby solving technical problems that network expandability is poor and a stable network traversing service cannot be provided for a scattered Internet access user, where the technical problems are brought about because the secure traversing gateway is deployed in a centralized manner in the core network of the carrier, improving network expandability of the carrier and reliability of network traversing, and reducing operating costs of the carrier.

Figure 9:
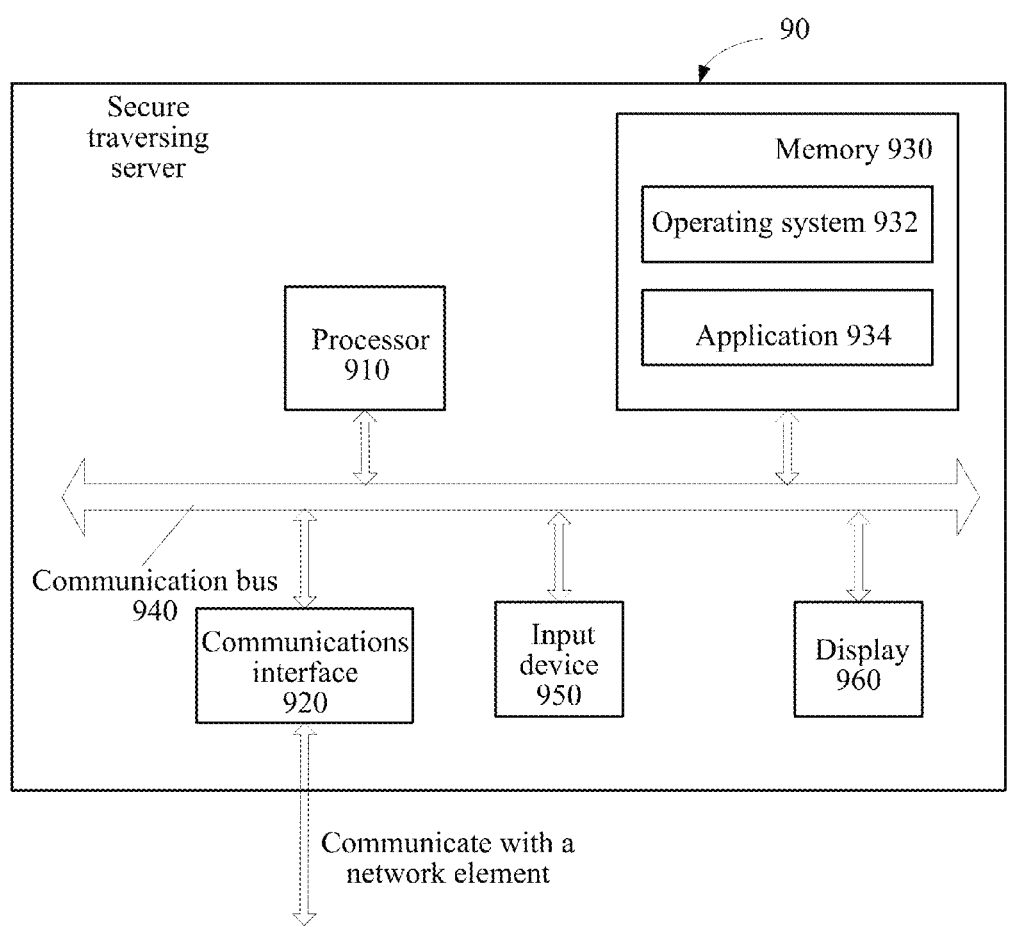
FIG. 9 is a schematic structural diagram of a secure traversing server according to an embodiment of the present invention.

FIG. 9 is a schematic structural diagram of a secure traversing server according to an embodiment of the present invention. The secure traversing server may be deployed in a network of a carrier or be deployed in a network established by an STaaS service provider, and the secure traversing server may be a server, a computer, or a computing node having computing and processing capabilities, which is not particularly limited here. As shown in FIG. 9, the secure traversing server 90 includes:

a processor 910, a communications interface 920, a memory 930, a communication bus 940, an input device 950, and a display 960.

The processor 910, the communications interface 920, the memory 930, the input device 950, and the display 960 communicate with each other through the communication bus 940.

The communications interface 920 is configured to communicate with a network element, where the network element includes a resource management center or a terminal.

The processor 910 is configured to execute an operating system 932 and an application 934; including executing related steps in the method embodiments shown in FIG. 4 to FIG. 6.

Specifically, the application 934 may include a program code, where the program code includes a computer operation instruction.

The processor 910 may be a central processing unit CPU, or an application specific integrated circuit ASIC (Application Specific Integrated Circuit), or be configured to one or more integrated circuits implementing the embodiments of the present invention.

The memory 930 is configured to store the operating system 932 and the application 934. The memory 930 may include a high-speed RAM memory, and may further include a non-volatile memory, for example, at least one disk memory.

The operating system 932 may be a Windows NT, a Windows 2007, or operating systems of some other Windows versions, and may also be an operating system of another type such as a Macintosh OS.

For specific implementation of functional modules in the application 934, reference may be made to corresponding modules in the following embodiments shown in FIG. 10 to FIG. 12, which is not described in detail here.

Figure 10:
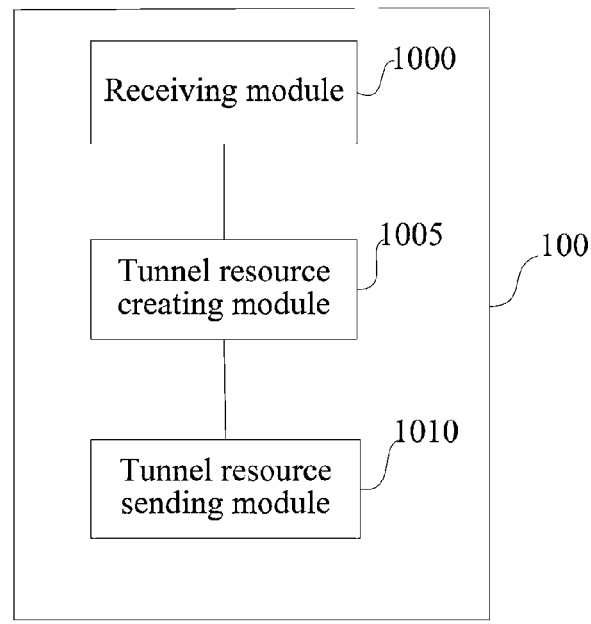
FIG. 10 is a schematic structural diagram of another secure traversing server according to an embodiment of the present invention.

FIG. 10 is a schematic structural diagram of a secure traversing server according to an embodiment of the present invention. As shown in FIG. 10, the secure traversing server described in this embodiment of the present invention includes:

A receiving module 1000 is configured to receive a network traversing tunnel resource creating instruction sent by a resource management center, where the network traversing tunnel resource creating instruction carries an identifier of a carrier, the number of virtual access points to be created and the number of users that can be borne by each virtual access point.

A tunnel resource creating module 1005 is configured to create, according to the number of virtual access points and the number of users, where the number of virtual access points and the number of users are in the network traversing tunnel resource creating instruction received by the receiving module 1000, a network traversing tunnel resource that satisfies a leasing requirement of the carrier, where the network traversing tunnel resource includes a virtual access point and a service channel interconnected to the virtual access point.

Specifically, the tunnel resource creating module 1005 may create, by adopting a virtualization technology and according to the network traversing tunnel resource creating instruction, a virtual access point and a service channel interconnected to the virtual access point that satisfy the leasing requirement, for example, may, through virtualization, allocate a virtual access point resource, configure an IP address or a domain name, and configure another parameter, so that each created virtual access point has functions of a secure traversing gateway, and can establish a virtual private network (VPN) tunnel with a terminal, and provide the terminal with an access capability of a VPN secure tunnel such as a hyper text transfer protocol (HTTP), a secure socket layer (SSL), an Internet protocol security (IPSec), a datagram transport layer security (DTLS) protocol, or a user datagram protocol (UDP) tunnel. A packet may be transmitted between the virtual access point and a server of a core network of the carrier through a service channel interconnected to the virtual access point, namely, the virtual access point may communicate with the core network of the carrier according to an address of the service channel interconnected to the virtual access point. It should be noted that, the address of the service channel is an address of an ingress of the core network of the carrier.

It should be noted that, after the tunnel resource creating module 1005 in the secure traversing server creates the virtual access point by adopting the virtualization technology, the virtual access point may have one-to-one, one-to-many, many-to-one, or many-to-many correspondence with the secure traversing server. The one-to-one correspondence belongs to a basic network traversing service deployment scenario. In the one-to-many correspondence, a hardware device performs traffic distribution, and acts as an agent of another secure traversing server of a same access point, so as to logically ensure that multiple secure traversing servers provide a service of the same access point outward. The many-to-one correspondence refers to that services of multiple virtual access points are started on a secure traversing server, and meanwhile, different virtual access points have lessee attributes, their respective independent authentication and authorization systems, core network resources, their respective independent networks that may be overlapped, routing tables, and virtual firewalls.

It may be understood that, after creating the network traversing tunnel resource for the carrier according to the network traversing tunnel resource creating instruction, the tunnel resource creating module 1005 may associate the created virtual access point with the created service channel according to the identifier of the carrier.

A tunnel resource sending module 1010 is configured to return information of the network traversing tunnel resource created by the tunnel resource creating module 1005 to the resource management center.

The information of the network traversing tunnel resource includes virtual access point information and service channel information. Specifically, the information of the network traversing tunnel resource includes, but is not limited to, the identifier of the carrier, an address of the virtual access point, an address of the service channel, a network segment, and a tunnel number, where the address of the virtual access point may be an IP address and may also be a domain name, for example, 10.10.10.10 or cloud.com, and the address of the service channel may also be expressed by an IP address or a domain name, for example, 200.1.1.1 or cmcc.com. In addition, the information of the network traversing tunnel resource may further include: information such as a protocol type and a lessee number. It may be understood that, the tunnel resource sending module 1010 may return the information of the network traversing tunnel resource to the resource management center in a manner of an information list, which is not limited here.

The secure traversing server described in this embodiment of the present invention can create the network traversing tunnel resource for the carrier according to the network traversing tunnel resource creating instruction sent by the resource management center, so that the carrier can provide a network traversing service for the terminal according to the leased network traversing tunnel resource, thereby improving network expandability of the carrier and reliability of network traversing, and reducing operating costs of the carrier.

Figure 11:
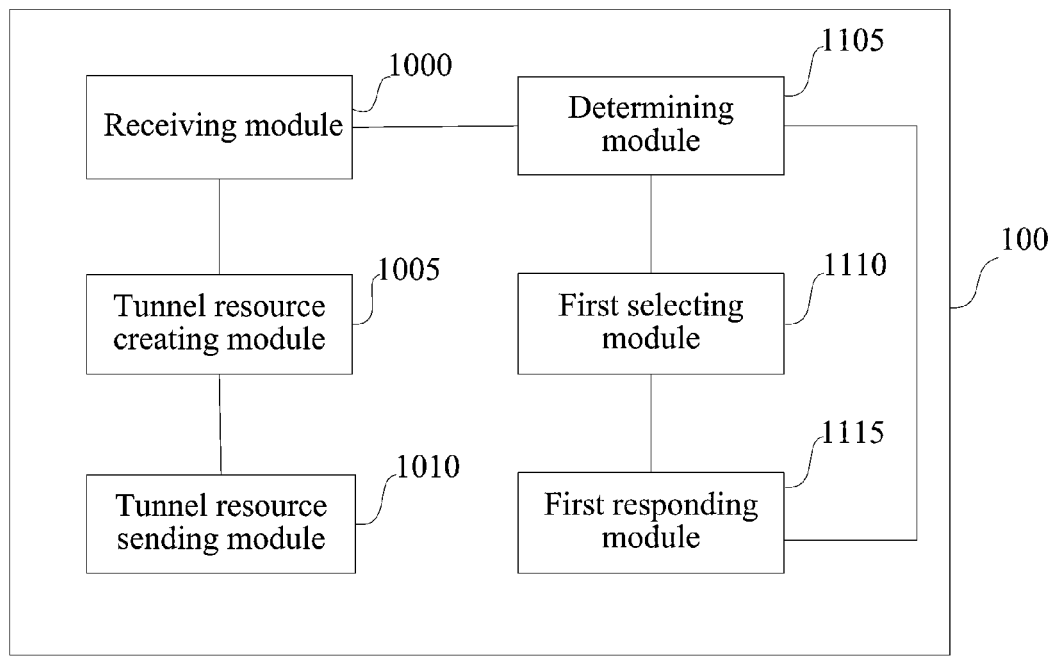
FIG. 11 is a schematic structural diagram of another secure traversing server according to an embodiment of the present invention.

FIG. 11 is a schematic structural diagram of another secure traversing server according to an embodiment of the present invention. As shown in FIG. 11, the secure traversing server 100 is based on the embodiment shown in FIG. 10.

The receiving module 1000 is further configured to receive a network traversing tunnel registering request from a terminal, where the network traversing tunnel registering request carries information of a first virtual access point to be accessed by the terminal, an identifier of a carrier to which the terminal belongs, and an address of a core network of the carrier.

The first virtual access point is a virtual access point randomly selected by the terminal. In addition, the network traversing tunnel registering request may further include lessee information, a user name, a password, and terminal type information, where the terminal type information includes information such as a model of a mobile terminal, a version of an operating system, and a version of a browser, so that the secure traversing server performs access authentication on the terminal.

The secure traversing server 110 may further include:

A determining module 1105 is configured to determine whether the first virtual access point is a virtual access point selected by the secure traversing server for the terminal, and if the first virtual access point is not the selected virtual access point, trigger a first selecting module 1110; otherwise, trigger a first responding module 1115.

Specifically, the determining module 1105 may determine, according to a set record table, whether the first virtual access point is the virtual access point selected by the secure traversing server for the terminal, where the record table records a use state of a virtual access point. If not, it indicates that the terminal performs access for the first time, and the first virtual access point is a virtual access point randomly selected by the terminal rather than an optimal virtual access point selected by the secure traversing server for the terminal. In addition, the secure traversing server may also determine, according to an access position, a load amount, or a probe response situation of the first virtual access point, whether the first virtual access point is the optimal virtual access point selected by the secure traversing server for the terminal. It not, trigger the first selecting module 1110; otherwise, trigger the first responding module 1115.

The first selecting module 1110 is configured to select, according to the identifier of the carrier and in the network traversing tunnel resource leased by the carrier, a second virtual access point for the terminal, and trigger the first responding module 1115.

Specifically, the information of the network traversing tunnel resource includes: lessee information of the virtual access point, a user load amount of the virtual access point, and an access area of the virtual access point. Preferably, the optimal virtual access point may be selected according to the information which is of the network traversing tunnel resource and is obtained through querying. Specifically, when selecting the optimal virtual access point, the first selecting module 1110 may select a virtual access point that has a smallest load amount, or a closest access position, or a fastest probe response as the optimal virtual access point according to the information of the network traversing tunnel resource. Certainly, it may be understood that, after selecting the virtual access point for the terminal, the first selecting module 1110 records related information or puts a corresponding identifier, so that when the receiving module 1000 receives a network traversing tunnel registering request of the terminal next time, the determining module 1105 may quickly determine whether the first virtual access point in the terminal is the selected virtual access point.

The first responding module 1115 is configured to return a network traversing tunnel registration success message to the terminal, where the network traversing tunnel registration success message includes information of the second virtual access point selected by the first selecting module 1110, so that the terminal accesses the core network of the carrier according to a network traversing tunnel established with the second virtual access point and the address of the core network of the carrier.

Specifically, in one case, after the authentication performed by the secure traversing server on the terminal succeeds, the secure traversing server may directly return a network traversing tunnel registration success message to the terminal, where the network traversing tunnel registration success message includes a registration result and the information of the second virtual access point selected by the secure traversing server for the terminal, and complete negotiation on a network traversing tunnel between the terminal and the second virtual access point, so that the terminal may access the core network of the carrier according to the network traversing tunnel established with the second virtual access point and the address of the core network of the carrier. Specifically, the second virtual access point may receive, through the network traversing tunnel established with the terminal, a packet sent by the terminal, and send the packet to the core network of the carrier after decapsulating the packet; and receive a response packet returned by the core network of the carrier, and send the response packet to the terminal through the network traversing tunnel after encapsulating the response packet. The terminal may communicate with the core network of the carrier through a virtual IP address allocated by the second virtual access point to the terminal. Specifically, the encapsulated packet includes the virtual IP address allocated by the second virtual access point to the terminal and the address of the core network of the carrier, and an encapsulated outer packet includes an IP address of the terminal and the IP address of the second virtual access point. It should be noted that, the network traversing tunnel established between the second virtual access point and the terminal may be a VPN secure tunnel of a type such as the HTTP, SSL, IPSec, DTLS, or UDP, which is not listed one by one here.

In another case, the first responding module 1115 is further configured to return a registration failure message to the terminal, where the registration failure message includes the information of the second virtual access point selected for the terminal, so that the terminal can re-initiate a network traversing tunnel registering request according to the information of the second virtual access point.

In still another case, when a determining result of the determining module 1105 is that the first virtual access point is the virtual access point selected by the secure traversing server for the terminal, the first responding module 1115 is further configured to return a network traversing tunnel registration success message to the terminal, so that the terminal accesses the core network of the carrier according to a network traversing tunnel established with the first virtual access point and the address of the core network of the carrier.

Specifically, in a case that the determining result of the determining module 1105 is that the first virtual access point is the virtual access point selected by the secure traversing server for the terminal, if the authentication performed by the secure traversing server on the terminal succeeds, the first responding module 1115 may further return a network traversing tunnel registration success message to the terminal, and completes negotiation on a network traversing tunnel between the terminal and the first virtual access point, so that the terminal can access the core network of the carrier according to the network traversing tunnel established with the first virtual access point and the address of the core network of the carrier. Specifically, the network traversing tunnel registration success message includes a registration result, and may further include information such as a virtual Internet protocol IP address and mask, a sending period of a packet for keeping connection, and an access policy.

The secure traversing server provided in this embodiment of the present invention selects the virtual access point for the terminal of the carrier according to the information of the network traversing tunnel resource leased by the carrier, and directly carries the information of the second virtual access point selected for the terminal in the network traversing tunnel registration success message returned to the terminal, so that the terminal does not need to re-initiate a network traversing tunnel registering request according to the information of the selected second virtual access point, thereby improving access efficiency of the terminal.

Figure 12:
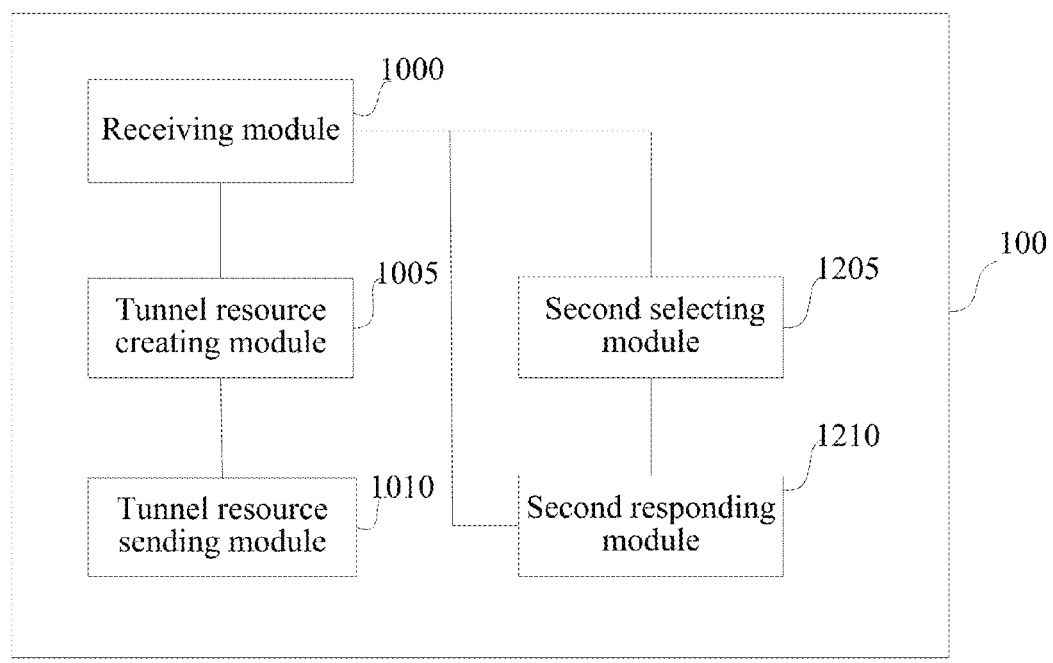
FIG. 12 is a schematic structural diagram of another secure traversing server according to an embodiment of the present invention.

FIG. 12 is a schematic structural diagram of another secure traversing server according to an embodiment of the present invention. As shown in FIG. 12, the secure traversing server 100 is based on the embodiment shown in FIG. 10.

The receiving module 1000 is further configured to receive an access point querying request from a terminal, where the querying request carries an identifier of a carrier to which the terminal belongs.

In one case, if the carrier leases only one virtual access point, a terminal in the network of the carrier may directly establish a network traversing tunnel with the one virtual access point leased by the carrier, access the core network of the carrier through the network traversing tunnel, and does not need to send the access point querying request. However, in actual application, one virtual access point is far away from satisfying access requirements of users, and therefore, the carrier usually leases multiple virtual access points from an STaaS service provider according to the number of users in the network. In this case, in order to obtain a better service, a user may initiate a virtual access point querying request to query for a preferable virtual access point. Specifically, the querying request may further include an initial access point of the user and an address of the core network which is of the carrier and is to be accessed.

The secure traversing server may further include:

A second selecting module 1205 is configured to select, according to the identifier which is of the carrier and is in the querying request received by the receiving module 1000, a virtual access point in the network traversing tunnel resource leased by the carrier.

The secure traversing server may, according to the identifier which is of the carrier and is in the leasing request, search for information of the network traversing tunnel resource leased by the carrier, and select a virtual access point for the terminal. Specifically, the information of the network traversing tunnel resource includes: lessee information of the virtual access point, a user load amount of the virtual access point, and an access area of the virtual access point. Preferably, the optimal virtual access point may be selected according to the information which is of the network traversing tunnel resource and is obtained through querying. Specifically, when selecting the optimal virtual access point, the second selecting module 1205 may select a virtual access point that has a smallest load amount, or a closest access position, or a fastest probe response as the optimal virtual access point according to the information of the network traversing tunnel resource. For example, in this embodiment, that the first virtual access point 120 is the optimal virtual access point is taken as an example for description. It may be understood that, after selecting the virtual access point for the terminal, the secure traversing server records related information or puts a corresponding identifier.

A second responding module 1210 is configured to return a query response message to the terminal, where the query response message includes information of the selected virtual access point.

After the second selecting module 1205 selects, according to the identifier of the carrier and in the network traversing tunnel resource leased by the carrier, the virtual access point for the terminal, a query response message may be returned to the terminal, where the query response message includes the information of the selected virtual access point.

The receiving module 1000 is further configured to receive a network traversing tunnel registering request from the terminal, where the network traversing tunnel registering request includes the information of the selected virtual access point and the address of the core network of the carrier.

After receiving the information which is of the selected virtual access point and is returned by the second responding module 1210, the terminal may initiate a network traversing tunnel registering request to the virtual access point. Because the secure traversing server is a set of virtual access points, the secure traversing server receives the network traversing tunnel registering request initiated by the terminal according to the selected virtual access point, where the network traversing tunnel registering request includes the information of the selected virtual access point and the address of the core network of the carrier. In addition, the network traversing tunnel registering request may further include lessee information, a user name, a password, and terminal type information, where the terminal type information includes information such as a model of a mobile terminal, a version of an operating system, and a version of a browser, so that the secure traversing server performs access authentication on the terminal.

The second responding module 1210 is further configured to return a network traversing tunnel registration success message to the terminal, so that the terminal accesses the core network of the carrier according to the address of the core network of the carrier and a network traversing tunnel established with the virtual access point.

When the authentication performed by the secure traversing server on the terminal succeeds, the secure traversing server returns a network traversing tunnel registration success message to the terminal, and completes negotiation on a network traversing tunnel. The network traversing tunnel registration success message includes a registration result, and may further include information such as a virtual Internet protocol IP address and mask, a sending period of a packet for keeping connection, and an access policy. A secure tunnel may include: a virtual private network (VPN) tunnel of a type such as a hyper text transfer protocol (HTTP), a secure socket layer (SSL), an Internet protocol security (IPSec), a datagram transport layer security (DTLS) protocol, or a user datagram protocol (UDP), which is not listed one by one here.

The secure traversing service server described in this embodiment of the present invention receives the access point querying request from the terminal, selects, in the network traversing tunnel resource leased by the carrier, the virtual access point for the terminal, and sends access information of the selected virtual access point to the terminal, so that the terminal establishes a network traversing tunnel with the selected virtual access point according to the access information of the selected virtual access point, thereby accessing the core network of the carrier according to the established network traversing tunnel, and implementing network traversing. The virtual access point is the optimal virtual access point after the selection of the server, and different terminals may implement network traversing through different selected virtual access points, so a burden of a traversing gateway is reduced, and reliability of network traversing is improved.

It should be noted that, the foregoing embodiments shown in FIG. 10, FIG. 11, and FIG. 12 may be used in combination, and may also be used separately, which is not limited here. It may be understood that, when the embodiments shown in FIG. 11 and FIG. 12 are used in combination, the second selecting module 1205 and the first selecting module 1110 may be combined into one module, and the second responding module 1210 and the first responding module 1115 may also be combined into one module.

Figure 13:
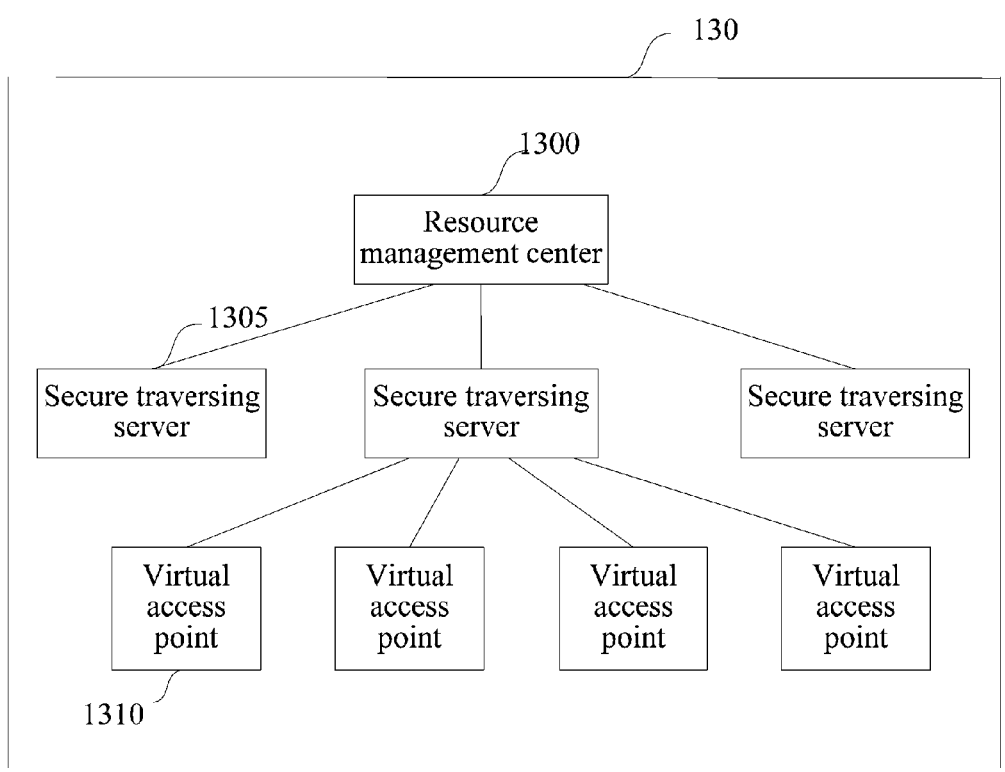
FIG. 13 is a diagram of a Security Traverse as a Service network system according to an embodiment of the present invention.

As shown in FIG. 13, FIG. 13 is a diagram of a Security Traverse as a Service (STaaS) network system according to an embodiment of the present invention. As shown in FIG. 13, the network system 130 includes a resource management center 1300, a secure traversing server 1305, and a virtual access point 1310, where there may be one or more secure traversing servers 1305, and there may also be one or more virtual access points 1310. The secure traversing server 1305 is a set of multiple virtual access points 1310, and may be deployed in an Internet data center (IDC) of a carrier, and may also be deployed in a network established by an STaaS provider. The resource management center 1300 is configured to manage, in a unified manner, network traversing tunnel resources created by all secure traversing servers 1305. Specifically, the number of secure traversing servers 1305 may be set according to a service area and the number of users, and the number of virtual access points 1310 may be created according to a leasing request of the carrier.

The resource management center 1300 is configured to receive a network traversing tunnel resource leasing request sent by a management server of a carrier, where the leasing request carries the number of virtual access points to be leased and the number of users borne by each virtual access point; send a network traversing tunnel resource creating instruction to the secure traversing server according to the leasing request; receive information of a network traversing tunnel resource created by the secure traversing server according to the number of virtual access points and the number of users; and send the information of the network traversing tunnel resource to the management server of the carrier, where the information of the network traversing tunnel resource includes virtual access point information and service channel information.

The secure traversing server 1305 is configured to create the network traversing tunnel resource according to the network traversing tunnel resource creating instruction sent by the resource management center 1300, and return the information of the created network traversing tunnel resource to the resource management center 1300, where the information of the network traversing tunnel resource includes the virtual access point information and the service channel information; receive an access point querying request sent by a terminal, where the querying request carries an identifier of a carrier to which the terminal belongs; select, according to the identifier of the carrier and in the network traversing tunnel resource leased by the carrier, a virtual access point; return a query response message to the terminal, where the query response message includes information of the selected virtual access point; receive a network traversing tunnel registering request from the terminal, where the network traversing tunnel registering request includes the information of the selected virtual access point and an address of a core network of the carrier; and return a network traversing tunnel registration success message to the terminal, so that the terminal accesses the core network of the carrier according to the address of the core network of the carrier and a network traversing tunnel established with the virtual access point.

The virtual access point 1310 is configured to receive, through the network traversing tunnel established with the terminal, a packet sent by the terminal, and send the packet to the core network of the carrier after decapsulating the packet; and receive a response packet returned by the core network of the carrier, and send the response packet to the terminal through the network traversing tunnel after encapsulating the response packet.

In this embodiment of the present invention, the STaaS provider provides a network traversing service resource leasing service for the carrier through the resource management center 1300, the STaaS provider is responsible for managing and operating a network traversing service resource, and the carrier may lease a required network traversing tunnel resource from the STaaS provider through the Internet according to an actual requirement of the carrier, and pay the STaaS provider according to the number of leased services and a duration for using the leased services. Meanwhile, the carrier may also obtain, through the Internet, a service, such as maintenance, provided by the STaaS provider for the network traversing tunnel resource. For detailed description of the resource management center 1300 and the secure traversing server 1305, reference may be made to the foregoing related embodiments, which is not repeatedly described here.

In the STaaS network system provided in this embodiment of the present invention, a security traverse as a service (STaaS) operating mode is created, the network traversing tunnel resource may be created for the carrier according to the leasing requirement of the carrier, and the created network traversing tunnel resource may be leased to the carrier, so that the carrier may provide a network traversing service for the terminal through the leased network traversing tunnel resource, and the terminal may access the core network of the carrier. Therefore, the network traversing tunnel resource can be managed and maintained in a unified manner, thereby solving technical problems that network expandability is poor and a stable network traversing service cannot be provided for a scattered Internet access user, where the technical problems are brought about because the secure traversing gateway is deployed in a centralized manner in the core network of the carrier, improving network expandability of the carrier and reliability of network traversing, and reducing operating costs of the carrier.

Persons of ordinary skill in the art should understand that, all or part of the steps of the foregoing method embodiments may be implemented by a program instructing relevant hardware. The foregoing program may be stored in a computer readable storage medium. When the program is run, the steps included in the foregoing method embodiments are performed. The foregoing storage medium includes any medium capable of storing program codes, such as a ROM, a RAM, a magnetic disk, or an optical disk.

Persons skilled in the art may clearly understand that, for the purpose of convenient and brief description, for a specific working process of the foregoing device and module, reference may be made to description of the corresponding process in the foregoing method embodiments, and details are not repeatedly described here.

In the several embodiments provided in the present application, it should be understood that the disclosed device and method may be implemented in other manners. For example, the apparatus embodiment described above is merely exemplary. For example, dividing of the modules is merely a kind of dividing of logical functions, and there may be other dividing manners in actual implementation. For example, a plurality of modules or components may be combined or may be integrated to another device, or some characteristics may be ignored or not performed. In addition, the shown or discussed mutual couplings or direct couplings or communication connections may be implemented via some communications interfaces. The indirect couplings or communication connections between apparatuses or units may be implemented in electrical, mechanical, or other forms.

The modules described as separate parts may or may not be physically separated, and parts shown as modules may or may not be physical units, may be located in one position, or may be distributed on a plurality of network units. Part or all of the modules may be selected according to an actual need to achieve the objectives of the solutions of the embodiments.

In addition, functional modules in the embodiments of the present invention may be integrated into a processing module, each of the modules may also exist alone physically, and two or more modules may also be integrated into one module.

Finally, it should be noted that the foregoing embodiments are merely intended for describing the technical solutions of the present invention, rather than limiting the present invention. Although the present invention is described in detail with reference to the foregoing embodiments, persons of ordinary skill in the art should understand that they may still make modifications to the technical solutions described in the foregoing embodiments, or make equivalent replacements to part or all of the technical features of the technical solutions described in the foregoing embodiments; however, these modifications or replacements do not make the essence of the corresponding technical solutions depart from the scope of the technical solutions of the embodiments of the present invention.

What is claimed is:

1. A system for providing a network traversing service comprising;
   a resource management center configured to:
      receive a network traversing tunnel resource leasing request sent by a management server of a communication carrier, wherein the network traversing tunnel resource leasing request includes information about a quantity of virtual access points to be leased and a quantity of users to be served by each of the virtual access points;
      send a network traversing tunnel resource creating instruction to a secure traversing server according to the network traversing tunnel resource leasing request, wherein the network traversing tunnel resource creating instruction comprises the information about the quantity of the virtual access points and the quantity of the users;
      receive information of a network traversing tunnel resource created by the secure traversing server according to the quantity of the virtual access points and the quantity of the users, wherein the information of the network traversing tunnel resource comprises virtual access point information and service channel information for providing tunneling for accessing a core network of the communication carrier; and
      send the information of the network traversing tunnel resource to the management server of the communication carrier; and
   the secure traversing server configured to:
      receive the network traversing tunnel resource creating instruction sent by the resource management center;
      create, according to the quantity of the virtual access points and the quantity of the users, the network traversing tunnel resource that satisfies a leasing requirement of the communication carrier, wherein the network traversing tunnel resource comprises a virtual access point and a service channel interconnected to the virtual access point that is a virtualized secure traversing gateway for (i) establishing a virtual private network (VPN) tunnel with a terminal belonging to the communication carrier and (ii) providing the terminal with a capability to access the VPN tunnel; and
      return the information of the created network traversing tunnel resource to the resource management center;
      receive from the terminal a network traversing tunnel registering request carrying information of (i) a first virtual access point to be accessed by the terminal, (ii) an identifier of the communication carrier to which the terminal belongs and (iii) an address of the core network of the communication carrier; and
      determine whether the first virtual access point is a virtual access point selected by the secure traversing server for the terminal and, when the first virtual access point is not the virtual access point selected by the secure traversing server for the terminal (i) selecting in accordance with the identifier of the communication carrier and within the network traversing tunnel resource leased by the carrier, a second virtual access point for the terminal and (ii) returning to the terminal a network traversing tunnel registration success message comprising information of the second virtual access point.

2. The system according to claim 1, wherein the secure traversing server is deployed in a network of the communication carrier and has a largest number of idle resources among a plurality of secure traversing servers deployed in the network of the communication carrier.

3. The system according to claim 1, wherein when the first virtual access point is selected by the secure traversing server for the terminal, the secure traversing server is further configured to return the network traversing tunnel registration success message to the terminal.

4. The system according to claim 1, wherein the second virtual access point comprises one of the following: a smallest user load amount, a closest access position, and a fastest probe response in the network traversing tunnel resources leased by the communication carrier.

5. A system for providing a network traversing service comprising;
a resource management center configured to:
receive a network traversing tunnel resource leasing request sent by a management server of a communication carrier, wherein the network traversing tunnel resource leasing request includes information about a quantity of virtual access points to be leased and a quantity of users to be served by each of the virtual access points;
send a network traversing tunnel resource creating instruction to a secure traversing server according to the network traversing tunnel resource leasing request, wherein the network traversing tunnel resource creating instruction comprises the information about the quantity of the virtual access points and the quantity of the users;
receive information of a network traversing tunnel resource created by the secure traversing server according to the quantity of the virtual access points and the quantity of the users, wherein the information of the network traversing tunnel resource comprises virtual access point information and service channel information for providing tunneling for accessing a core network of the communication carrier; and
send the information of the network traversing tunnel resource to the management server of the communication carrier; and
the secure traversing server configured to:
receive the network traversing tunnel resource creating instruction sent by the resource management center;
create, according to the quantity of the virtual access points and the quantity of the users, the network traversing tunnel resource that satisfies a leasing requirement of the communication carrier, wherein the network traversing tunnel resource comprises a virtual access point and a service channel interconnected to the virtual access point that is a virtualized secure traversing gateway for (i) establishing a virtual private network (VPN) tunnel with a terminal belonging to the communication carrier and (ii) providing the terminal with a capability to access the VPN tunnel; and
return the information of the created network traversing tunnel resource to the resource management center;
receive an access point querying request from the terminal, wherein the access point querying request carries the identifier of the communication carrier to which the terminal belongs;
select, in the network traversing tunnel resource leased by the communication carrier, a target virtual access point according to the identifier of the communication carrier;
return a query response message to the terminal, wherein the query response message comprises information of the target virtual access point;
receive a tunnel registering request from the terminal, wherein the tunnel registering request comprises the information of the target virtual access point and the address of the core network of the communication carrier which provides converged communications services; and
determine whether the target virtual access point is a virtual access point selected by the secure traversing server for the terminal and, when the target virtual access point is not the virtual access point selected by the secure traversing server for the terminal, (i) select in accordance with the identifier of the communication carrier and within the network traversing tunnel resource leased by the carrier, a first virtual access point for the terminal and (ii) return a network traversing tunnel registration success message to the terminal comprising information of the first virtual access point.

6. The system according to claim 5, wherein the secure traversing server is configured to:
according to the identifier of the communication carrier, select, in the network traversing tunnel resource leased by the communication carrier, the target virtual access point that comprises one of the following: a smallest user load amount, a closest access position, and a fastest probe response in the network traversing tunnel resources leased by the communication carrier.

7. A secure traversing server for providing a network traversing service to access a core network of a communication carrier the secure traversing server comprising:
a communications interface configured to communicate with a resource management center; and
a processor and a non-transitory, computer-readable memory storing instructions for execution by the processor such that when the processor executes the instructions it is configured to:
receive a network traversing tunnel resource creating instruction sent by the resource management center, wherein the network traversing tunnel resource creating instruction comprises information about a quantity of virtual access points needing to be leased by the communication carrier and a quantity of users to be served by each of the virtual access points;
create, according to the quantity of the virtual access points and the quantity of the users, a network traversing tunnel resource that satisfies a leasing requirement of the communication carrier, wherein the network traversing tunnel resource for providing tunneling for accessing the core network of the communication carrier comprises a virtual access point and a service channel interconnected to the virtual access point that is a virtualized secure traversing gateway for (i) establishing a virtual private network (VPN) tunnel with a terminal belonging to the communication carrier and (ii) providing the terminal with a capability to access the VPN tunnel;
return the information of the created network traversing tunnel resource to the resource management center;

receive from the terminal a network traversing tunnel registering request carrying information of (i) a first virtual access point to be accessed by the terminal, (ii) an identifier of the communication carrier to which the terminal belongs and (iii) an address of the core network of the communication carrier; and determine whether the first virtual access point is a virtual access point selected by the secure traversing server for the terminal and when the first virtual access point is not the virtual access point selected by the secure traversing server for the terminal, (i) selecting in accordance with the identifier of the communication carrier and within the network traversing tunnel resource leased by the carrier, a second virtual access point for the terminal and (ii) returning to the terminal a network traversing tunnel registration success message comprising information of the second virtual access point.

8. The secure traversing server according to the claim 7, wherein:

when the first virtual access point is selected by the secure traversing server for the terminal the secure traversing server is further configured to return the network traversing tunnel registration success message to the terminal.

9. The secure traversing server according to the claim 7, wherein the second virtual access point comprises one of the following: a smallest user load amount, a closest access position, and a fastest probe response in the network traversing tunnel resources leased by the communication carrier.

10. A secure traversing server for providing a network traversing service to access a core network of a communication carrier the secure traversing server comprising:

a processor and a non-transitory, computer-readable memory storing instructions for execution by the processor such that when the processor executes the instructions it is configured to:

receive a network traversing tunnel resource creating instruction sent by the resource management center, wherein the network traversing tunnel resource creating instruction comprises information about a quantity of virtual access points needing to be leased by the communication carrier and a quantity of users to be served by each of the virtual access points;

create according to the quantity of the virtual access points and the quantity of the users a network traversing tunnel resource that satisfies a leasing requirement of the communication carrier, wherein the network traversing tunnel resource for providing tunneling for accessing the core network of the communication carrier comprises a virtual access point and a service channel interconnected to the virtual access point that is a virtualized secure traversing gateway for (i) establishing a virtual private network (VPN) tunnel with a terminal belonging to the communication carrier and (ii) providing the terminal with a capability to access the VPN tunnel;

return the information of the created network traversing tunnel resource to the resource management center;

a communications interface configured to communicate with a terminal and the processor to:

receive an access point querying request sent by the terminal, wherein the access point querying request carries the identifier of the communication carrier to which the terminal belongs;

select, in the network traversing tunnel resource leased by the communication carrier, a target virtual access point according to the identifier of the communication carrier;

return a query response message to the terminal, wherein the query response message comprises information of the target virtual access point;

receive a network traversing tunnel registering request from the terminal, wherein the network traversing tunnel registering request comprises the information of the target virtual access point and the address of the core network of the communication carrier which provides converged communications services; and return a network traversing tunnel registration success message to the terminal.

11. The secure traversing server according to claim 10, wherein the processor is further configured to select, according to the identifier of the communication carrier, the target virtual access point in the network traversing tunnel resource leased by the communication carrier that comprises one of the following: a smallest user load amount, a closest access position, and a fastest probe response in the network traversing tunnel resources leased by the communication carrier.

12. A method performed by a secure traversing server for providing a network traversing service to access a core network of a communication carrier, the method comprising:

receiving a network traversing tunnel resource creating instruction sent by a resource management center, wherein the network traversing tunnel resource creating instruction comprises information about a quantity of virtual access points needing to be leased by the communication carrier and a quantity of users to be served by each of the virtual access points;

creating, according to the quantity of the virtual access points and the quantity of the users, a network traversing tunnel resource that satisfies a leasing requirement of the communication carrier, wherein the network traversing tunnel resource for providing tunneling for accessing a core network of the communication carrier comprises a virtual access point and a service channel interconnected to the virtual access point that is a virtualized secure traversing gateway for (i) establishing a virtual private network (VPN) tunnel with a terminal belonging to the communication carrier and (ii) providing the terminal with a capability to access the VPN tunnel; and returning information of the created network traversing tunnel resource to the resource management center;

receiving from the terminal a network traversing tunnel registering request carrying information of (i) a first virtual access point to be accessed by the terminal, (ii) an identifier of the communication carrier to which the terminal belongs and (iii) an address of the core network of the communication carrier; and determining whether the first virtual access point is a virtual access point selected by the secure traversing server for the terminal and, when the first virtual access point is not the virtual access point selected by the secure traversing server for the terminal (i) selecting in accordance with the identifier of the communication carrier and within the network traversing tunnel resource leased by the carrier, a second virtual access point for the terminal and (ii) returning to the terminal a network traversing tunnel registration success message comprising information of the second virtual access point.

13. The method according to claim 12, wherein the second virtual access point comprises one of the following: a smallest user load amount, a closest access position, and a fastest probe response in the network traversing tunnel resources leased by the communication carrier.

14. A method performed by a secure traversing server for providing a network traversing service to access a core network of a communication carrier, the method comprising:
receiving a network traversing tunnel resource creating instruction sent by a resource management center wherein the network traversing tunnel resource creating instruction comprises information about a quantity of virtual access points needing to be leased by the communication carrier and a quantity of users to be served by each of the virtual access points;
creating, according to the quantity of the virtual access points and the quantity of the users, a network traversing tunnel resource that satisfies a leasing requirement of the communication carrier, wherein the network traversing tunnel resource for providing tunneling for accessing a core network of the communication carrier comprises a virtual access point and a service channel interconnected to the virtual access point that is a virtualized secure traversing gateway for (i) establishing a virtual private network (VPN) tunnel with a terminal belonging to the communication carrier and (ii) providing the terminal with a capability to access the VPN tunnel;
returning information of the created network traversing tunnel resource to the resource management center;
receiving an access point querying request sent by the terminal, wherein the access point querying request carries an identifier of the communication carrier to which the terminal belongs;
selecting, in the network traversing tunnel resource leased by the communication carrier, a target virtual access point according to the identifier of the communication carrier;
returning a query response message to the terminal, wherein the query response message comprises information of the target virtual access point;
receiving a network traversing tunnel registering request from the terminal, wherein the network traversing tunnel registering request comprises the information of the target virtual access point and an address of the core network of the communication carrier which provides converged communications services; and
returning a network traversing tunnel registration success message to the terminal.

15. The method according to claim 14 including selecting, according to the identifier of the communication carrier, the target virtual access point that comprises one of the following: a smallest user load amount, a closest access position, and a fastest probe response in the network traversing tunnel resources leased by the communication carrier.

* * * * *